United States Patent
Löhr et al.

(10) Patent No.: US 8,737,336 B2
(45) Date of Patent: May 27, 2014

(54) ENHANCED RANDOM ACCESS PROCEDURE FOR MOBILE COMMUNICATIONS

(75) Inventors: Joachim Löhr, Wiesbaden (DE); Hidetoshi Suzuki, Kanagawa (JP); Osvaldo Gonsa, Frankfurt (DE); Martin Feuersänger, Bremen (DE)

(73) Assignee: Panasonic Corporation, Osaka (JP)

( * ) Notice: Subject to any disclaimer, the term of this patent is extended or adjusted under 35 U.S.C. 154(b) by 224 days.

(21) Appl. No.: 13/378,620

(22) PCT Filed: Jun. 15, 2010

(86) PCT No.: PCT/EP2010/003577
§ 371 (c)(1), (2), (4) Date: Mar. 1, 2012

(87) PCT Pub. No.: WO2010/145799
PCT Pub. Date: Dec. 23, 2010

(65) Prior Publication Data
US 2012/0147830 A1    Jun. 14, 2012

(30) Foreign Application Priority Data
Jun. 18, 2009  (EP) .................................... 09163134

(51) Int. Cl.
H04W 4/00 (2009.01)
H04W 72/04 (2009.01)

(52) U.S. Cl.
CPC ................................. *H04W 72/042* (2013.01)
USPC ........................................ 370/329; 370/474

(58) Field of Classification Search
USPC ................... 370/328, 329, 338, 341
See application file for complete search history.

(56) References Cited

U.S. PATENT DOCUMENTS

| | | | |
|---|---|---|---|
| 2010/0008348 A1* | 1/2010 | Zhang et al. | 370/345 |
| 2010/0067412 A1* | 3/2010 | Kitazoe et al. | 370/294 |
| 2010/0067498 A1 | 3/2010 | Lee | |
| 2010/0067501 A1* | 3/2010 | Yu et al. | 370/336 |
| 2010/0216483 A1 | 8/2010 | Tynderfeldt | |

(Continued)

FOREIGN PATENT DOCUMENTS

| | | |
|---|---|---|
| WO | 2008/041936 | 4/2008 |
| WO | 2008/054114 | 5/2008 |
| WO | 2009/057932 | 5/2009 |
| WO | 2009/058065 | 5/2009 |

OTHER PUBLICATIONS

International Search Report dated Sep. 22, 2010.

(Continued)

Primary Examiner — Kan Yuen
(74) Attorney, Agent, or Firm — Dickinson Wright PLLC

(57) ABSTRACT

The invention relates to a random access procedure for use in a mobile communication system. Furthermore, the invention also provides a mobile terminal and a base station that as suitably adapted to perform the random access procedure as well as the definition of a special format of a random access response message signalled during the random access procedure. To suggest a random access procedure that allows more information to be conveyed in the first scheduled transmission of the random access procedure, the invention proposes a random access procedure for use in a mobile communication system, wherein a base station transmits a random access response in response to receiving a random access preamble from a mobile terminal, wherein the random access response message comprises a grant for a scheduled transmission by the mobile terminal and an indication on the uplink transmission mode for the scheduled transmission.

15 Claims, 12 Drawing Sheets

| | 8 bits (one octet) |
|---|---|
| 1st octet | R \| Timing Advance Com- |
| 2nd octet | mand \| UL Grant |
| 3rd octet | UL Grant (continued) |
| 4th octet | UL Grant (continued)  :TM |
| 5th octet | Temporary C-RNTI |
| 6th octet | Temporary C-RNTI (cont.) |

(56) References Cited

U.S. PATENT DOCUMENTS

2010/0272035 A1    10/2010  Park
2010/0296576 A1*   11/2010  Citta et al. ............... 375/240.02

OTHER PUBLICATIONS

3GPP TSG-RAN WG2 #53, Motorola, "LTE Random Access Procedure," vol. R2-061463, Agenda item 11.10, May 8, 2006, pp. 1-4.

3GPP TSG-RAN WG2 #54, T-Mobile, NTT DoCoMo, Vodafone, Orange, KPN, "Operator requirements and scenarios for UL buffer reporting/scheduling and grant assignment in E-UTRAN," vol. R2-062606, Agenda Item 11.3.6, Aug. 28, 2006, pp. 1-2.

3GPP TS 36.321 V 8.5.0, "LTE; Evolved Universal Terrestrial Radio Access (E-UTRA); Medium Access Control (MAC) protocol specification (Release 8)," ETSI TS 136 321, Apr. 2009, pp. 1-47.

Japanese Notice of Reasons for Rejection dated Feb. 25, 2014 with English translation.

* cited by examiner

ENHANCED RANDOM ACCESS PROCEDURE FOR MOBILE COMMUNICATIONS

FIELD OF THE INVENTION

The invention relates to a random access procedure for use in a mobile communication system. Furthermore, the invention also provides a mobile terminal (e.g. a user equipment) and a base station (e.g. an eNodeB) that as suitably adapted to perform the random access procedure as well as the definition of a special format of a random access response message signalled during the random access procedure.

TECHNICAL BACKGROUND

Long Term Evolution (LTE)

Third-generation mobile systems (3G) based on WCDMA radio-access technology are being deployed on a broad scale all around the world. A first step in enhancing or evolving this technology entails introducing High-Speed Downlink Packet Access (HSDPA) and an enhanced uplink, also referred to as High Speed Uplink Packet Access (HSUPA), giving a radio-access technology that is highly competitive.

In order to be prepared for further increasing user demands and to be competitive against new radio access technologies 3GPP introduced a new mobile communication system which is called Long Term Evolution (LTE). LTE is designed to meet the carrier needs for high speed data and media transport as well as high capacity voice support to the next decade. The ability to provide high bit rates is a key measure for LTE.

The work item (WI) specification on Long-Term Evolution (LTE) called Evolved UMTS Terrestrial Radio Access (UTRA) and UMTS Terrestrial Radio Access Network (UTRAN) is to be finalized as Release 8 (LTE Rel. 8). The LTE system represents efficient packet-based radio access and radio access networks that provide full IP-based functionalities with low latency and low cost. The detailed system requirements are given in. In LTE, scalable multiple transmission bandwidths are specified such as 1.4, 3.0, 5.0, 10.0, 15.0, and 20.0 MHz, in order to achieve flexible system deployment using a given spectrum. In the downlink, Orthogonal Frequency Division Multiplexing (OFDM) based radio access was adopted because of its inherent immunity to multipath interference (MPI) due to a low symbol rate, the use of a cyclic prefix (CP), and its affinity to different transmission bandwidth arrangements. Single-carrier frequency division multiple access (SC-FDMA) based radio access was adopted in the uplink, since provisioning of wide area coverage was prioritized over improvement in the peak data rate considering the restricted transmission power of the user equipment (UE). Many key packet radio access techniques are employed including multiple-input multiple-output (MIMO) channel transmission techniques, and a highly efficient control signaling structure is achieved in LTE Rel. 8.

LTE Architecture

The overall architecture is shown in FIG. 1 and a more detailed representation of the E-UTRAN architecture is given in FIG. 2. The E-UTRAN consists of eNode B, providing the E-UTRA user plane (PDCP/RLC/MAC/PHY) and control plane (RRC) protocol terminations towards the user equipment (UE). The eNode B (eNB) hosts the Physical (PHY), Medium Access Control (MAC), Radio Link Control (RLC), and Packet Data Control Protocol (PDCP) layers that include the functionality of user-plane header-compression and encryption. It also offers Radio Resource Control (RRC) functionality corresponding to the control plane. It performs many functions including radio resource management, admission control, scheduling, enforcement of negotiated uplink QoS, cell information broadcast, ciphering/deciphering of user and control plane data, and compression/decompression of downlink/uplink user plane packet headers. The eNode Bs are interconnected with each other by means of the X2 interface.

The eNode Bs are also connected by means of the S1 interface to the EPC (Evolved Packet Core), more specifically to the MME (Mobility Management Entity) by means of the S1-MME and to the Serving Gateway (SGW) by means of the S1-U. The S1 interface supports a many-to-many relation between MMEs/Serving Gateways and eNode Bs. The SGW routes and forwards user data packets, while also acting as the mobility anchor for the user plane during inter-eNode B handovers and as the anchor for mobility between LTE and other 3GPP technologies (terminating S4 interface and relaying the traffic between 2G/3G systems and PDN GW). For idle state user equipments, the SGW terminates the downlink data path and triggers paging when downlink data arrives for the user equipment. It manages and stores user equipment contexts, e.g. parameters of the IP bearer service, network internal routing information. It also performs replication of the user traffic in case of lawful interception.

The MME is the key control-node for the LTE access-network. It is responsible for idle mode user equipment tracking and paging procedure including retransmissions. It is involved in the bearer activation/deactivation process and is also responsible for choosing the SGW for a user equipment at the initial attach and at time of intra-LTE handover involving Core Network (CN) node relocation. It is responsible for authenticating the user (by interacting with the HSS). The Non-Access Stratum (NAS) signaling terminates at the MME and it is also responsible for generation and allocation of temporary identities to user equipments. It checks the authorization of the user equipment to camp on the service provider's Public Land Mobile Network (PLMN) and enforces user equipment roaming restrictions. The MME is the termination point in the network for ciphering/integrity protection for NAS signaling and handles the security key management. Lawful interception of signaling is also supported by the MME. The MME also provides the control plane function for mobility between LTE and 2G/3G access networks with the S3 interface terminating at the MME from the SGSN. The MME also terminates the S6a interface towards the home HSS for roaming user equipments.

Uplink Access Scheme for LTE

For uplink transmission, power-efficient user-terminal transmission is necessary to maximize coverage. Single-carrier transmission combined with FDMA (Frequency Division Multiple Access) with dynamic bandwidth allocation has been chosen as the evolved UTRA uplink transmission scheme. The main reason for the preference for single-carrier transmission is the lower peak-to-average power ratio (PAPR), compared to multi-carrier signals (OFDMA—Orthogonal Frequency Division Multiple Access), and the corresponding improved power-amplifier efficiency and assumed improved coverage (higher data rates for a given terminal peak power). During each time interval, eNode B assigns users a unique time/frequency resource for transmitting user data thereby ensuring intra-cell orthogonality. An orthogonal access in the uplink promises increased spectral efficiency by eliminating intra-cell interference. Interference due to multipath propagation is handled at the base station (eNode B), aided by insertion of a cyclic prefix in the transmitted signal.

The basic physical resource used for data transmission consists of a frequency resource of size $BW_{grant}$ during one time interval, e.g. a sub-frame of 0.5 ms, onto which coded information bits are mapped. It should be noted that a sub-frame, also referred to as transmission time interval (TTI), is the smallest time interval for user data transmission. It is however possible to assign a frequency resource $BW_{grant}$ over a longer time period than one TTI to a user by concatenation of sub-frames.

The frequency resource can either be in a localized or distributed spectrum as illustrated, however for 3GPP LTE (Rel. 8) it was decided to only support localized allocations in the uplink. As can be seen from FIG. 3, localized single-carrier is characterized by the transmitted signal having a continuous spectrum that occupies a part of the total available spectrum. Different symbol rates (corresponding to different data rates) of the transmitted signal imply different bandwidths of a localized single-carrier signal.

On the other hand distributed single-carrier is characterized by the transmitted signal having a non-continuous ("comb-shaped") spectrum that is distributed over system bandwidth. Note that, although the distributed single-carrier signal is distributed over the system bandwidth, the total amount of occupied spectrum is, in essence, the same as that of localized single-carrier. Furthermore, for higher/lower symbol rate, the number of "comb-fingers" is increased/reduced, while the "bandwidth" of each "comb finger" remains the same.

Distributed transmission can provide, a larger frequency diversity gain than localized transmission, while localized transmission more easily allows for channel-dependent scheduling. Note that, in many cases the scheduling decision may decide to give the whole bandwidth to a single user equipment to achieve high data rates.

Uplink Scheduling Scheme for LTE

The uplink scheme allows for both scheduled access, i.e. controlled by eNodeB, and contention based access.

In case of scheduled access the user equipment is allocated a certain frequency resource for a certain time (i.e. a time/frequency resource) for uplink data transmission. However, some time/frequency resources can be allocated for contention based access. Within these time/frequency resources, user equipments can transmit without first being scheduled. One scenario where user equipment is making a contention based access is for example the random access, i.e. when user equipment is performing initial access to a cell or for requesting uplink resources.

For the scheduled access eNode B scheduler assigns a user a unique frequency/time resource for uplink data transmission. More specifically the scheduler determines
  which user equipment(s) that is (are) allowed to transmit,
  which physical channel resources (frequency),
  Transport format (Transport Block Size (TBS) and Modulation Coding Scheme (MCS)) to be used by the mobile terminal for transmission The allocation information is signaled to the user equipment via a scheduling grant, sent on the so-called L1/L2 control channel. For simplicity, this downlink channel is referred to the "uplink grant channel" in the following.

A scheduling grant message (also referred to as an resource assignment herein) contains at least information which part of the frequency band the user equipment is allowed to use, the validity period of the grant, and the transport format the user equipment has to use for the upcoming uplink transmission. The shortest validity period is one sub-frame. Additional information may also be included in the grant message, depending on the selected scheme. Only "per user equipment" grants are used to grant the right to transmit on the Uplink Shared Channel UL-SCH (i.e. there are no "per user equipment per RB" grants). Therefore the user equipment needs to distribute the allocated resources among the radio bearers according to some rules, which will be explained in detail in the next section.

Unlike in HSUPA there is no user equipment based transport format selection. The base station (eNodeB) decides the transport format based on some information, e.g. reported scheduling information and QoS information, and user equipment has to follow the selected transport format. In HSUPA eNodeB assigns the maximum uplink resource and user equipment selects accordingly the actual transport format for the data transmissions.

Uplink data transmissions are only allowed to use the time-frequency resources assigned to the user equipment through the scheduling grant. If the user equipment does not have a valid grant, it is not allowed to transmit any uplink data. Unlike in HSUPA, where each user equipment is always allocated a dedicated channel there is only one uplink data channel shared by multiple users (UL-SCH) for data transmissions.

To request resources, the user equipment transmits a resource request message to the eNodeB. This resources request message could for example contain information on the buffer status, the power status of the user equipment and some Quality of Services (QoS) related information. This information, which will be referred to as scheduling information, allows eNodeB to make an appropriate resource allocation. Throughout the document it's assumed that the buffer status is reported for a group of radio bearers. Of course other configurations for the buffer status reporting are also possible. Since the scheduling of radio resources is the most important function in a shared channel access network for determining Quality of Service, there are a number of requirements that should be fulfilled by the uplink scheduling scheme for LTE in order to allow for an efficient QoS management (see 3GPP RAN WG#2 Tdoc. R2-R2-062606, "QoS operator requirements/use cases for services sharing the same bearer", by T-Mobile, NTT DoCoMo, Vodafone, Orange, KPN; available at http://www.3gpp.org/ and incorporated herein by reference):
  Starvation of low priority services should be avoided
  Clear QoS differentiation for radio bearers/services should be supported by the scheduling scheme
  The uplink reporting should allow fine granular buffer reports (e.g. per radio bearer or per radio bearer group) in order to allow the eNode B scheduler to identify for which Radio Bearer/service data is to be sent.
  It should be possible to make clear QoS differentiation between services of different users
  It should be possible to provide a minimum bit-rate per radio bearer As can be seen from above list one essential aspect of the LTE scheduling scheme is to provide mechanisms with which the operator can control the partitioning of its aggregate cell capacity between the radio bearers of the different QoS classes. The QoS class of a radio bearer is identified by the QoS profile of the corresponding SAE bearer signaled from serving gateway to eNode B as described before. An operator can then allocate a certain amount of its aggregate cell capacity to the aggregate traffic associated with radio bearers of a certain QoS class.

The main goal of employing this class-based approach is to be able to differentiate the treatment of packets depending on the QoS class they belong to. For example, as the load in a cell increases, it should be possible for an operator to handle this by throttling traffic belonging to a low-priority QoS class. At this stage, the high-priority traffic can still experience a lowloaded situation, since the aggregate resources allocated to this traffic is sufficient to serve it. This should be possible in both uplink and downlink direction.

One benefit of employing this approach is to give the operator full control of the policies that govern the partitioning of the bandwidth. For example, one operator's policy could be to, even at extremely high loads, avoid starvation of traffic belonging to its lowest priority QoS Class. The avoidance of starvation of low priority traffic is one of the main requirements for the uplink scheduling scheme in LTE. In current UMTS Release 6 (HSUPA) scheduling mechanism the absolute prioritization scheme may lead to starvation of low priority applications. E-TFC selection (Enhanced Transport Format Combination selection) is done only in accordance to absolute logical channel priorities, i.e. the transmission of high priority data is maximized, which means that low priority data is possibly starved by high priority data. In order to avoid starvation the eNode B scheduler must have means to control from which radio bearers a user equipment transmits data. This mainly influences the design and use of the scheduling grants transmitted on the L1/L2 control channel in downlink. In the following the details of the uplink rate control procedure in LTE is outlined.

Random Access Procedure

A mobile terminal in LTE can only be scheduled for uplink transmission, if its uplink transmission is time synchronized. Therefore the Random Access (RACH) procedure plays an important role as an interface between non-synchronized mobile terminals (UEs) and the orthogonal transmission of the uplink radio access.

Essentially the Random Access in LTE is used to achieve uplink time synchronization for a user equipment which either has not yet acquired, or has lost, its uplink synchronization. Once a user equipment has achieved uplink synchronization the eNodeB can schedule uplink transmission resources for it. The following scenarios are therefore relevant for random access:

A user equipment in RRC_CONNECTED state, but not uplink-synchronized, wishing to send new uplink data or control information A user equipment in RRC_CONNECTED state, but not uplink-synchronized, required to receive downlink data, and therefore to transmit corresponding HARQ feedback, i.e. ACK/NACK, in the uplink. This scenario is also referred to as Downlink data arrival A user equipment in RRC_CONNECTED state, handing over from its current serving cell to a new target cell; in order to achieve uplink time-synchronization in the target cell Random Access procedure is performed A transition from RRC_IDLE state to RRC_CONNECTED, for example for initial access or tracking area updates Recovering from radio link failure, i.e. RRC connection re-establishment There is one more additional case, where user equipment performs random access procedure, even though user equipment is time-synchronized. In this scenario the user equipment uses the random access procedure in order to send a scheduling request, i.e. uplink buffer status report, to its eNodeB, in case it does not have any other uplink resource allocated in which to send the scheduling request, i.e. dedicated scheduling request (D-SR) channel is not configured.

LTE offers two types of random access procedures that allow access to be either contention based, i.e. implying an inherent risk of collision, or contention-free (non-contention based). It should be noted that contention-based random access can be applied for all six scenarios listed above, whereas a non-contention based random access procedure can only be applied for the downlink data arrival and handover scenario.

In the following the contention based random access procedure is being described in more detail with respect to FIG. 5. A detailed description of the random access procedure can be also found in 3GPP TS 36.321, "Evolved Universal Terrestrial Radio Access (E-UTRA); Medium Access Control (MAC) protocol specification", version 8.5.0, available at http://www.3gpp.org and incorporated herein by reference. FIG. 5 shows the contention based RACH procedure of LTE. This procedure consists of four "steps". First, the user equipment transmits 501 a random access preamble on the Physical Random Access Channel (PRACH) to the eNodeB. The preamble is selected by user equipment from the set of available random access preambles reserved by eNodeB for contention based access. In LTE, there are 64 preambles per cell which can be used for contention-free as well as contention based random access. The set of contention based preambles can be further subdivided into two groups, so that the choice of preamble can carry one bit of information to indicate information relating to the amount of transmission resources needed to transmit for the first scheduled transmission, which is referred to as msg3 in TS36.321 (see step 503). The system information broadcasted in the cell contain the information which signatures (preambles) are in each of the two subgroups as well as the meaning of each subgroup. The user equipment randomly selects one preamble from the subgroup corresponding to the size of transmission resource needed for message 3 transmission.

After eNodeB has detected a RACH preamble, it sends 502 a Random Access Response (RAR) on the PDSCH (Physical Downlink Shared Channel) addressed on the PDCCH with the (Random Access) RA-RNTI identifying the time-frequency slot in which the preamble was detected. If multiple user equipments transmitted the same RACH preamble in the same PRACH resource, which is also referred to as collision, they would receive the same random access response.

The random access response itself conveys the detected RACH preamble, a timing alignment command (TA command) for synchronization of subsequent uplink transmissions, an initial uplink resource assignment (grant) for the transmission of the first scheduled transmission (see step 503) and an assignment of a Temporary Cell Radio Network Temporary Identifier (T-CRNTI). This T-CRNTI is used by eNodeB in order to address the mobile(s) whose RACH preamble were detected until RACH procedure is finished, since the "real" identity of the mobile is at this point not yet known by eNodeB.

Furthermore the random access message can also contain a so-called back-off indicator, which the eNodeB can set to instruct the user equipment to back off for a period of time before retrying a random access attempt. The user equipment monitors the PDCCH for reception of random access response within a given time window, which is configured by the eNodeB. In case user equipment doesn't receive a random access response within the configured time window, it retransmits the preamble at the next PRACH opportunity considering a potentially back off period.

In response to the random access response message received from the eNodeB, the user equipment transmits 503 the first scheduled uplink transmission on the resources assigned by the grant within the random access response. This scheduled uplink transmission conveys the actual random access procedure message like for example RRC connection request, tracking area update or buffer status report. Furthermore it includes either the C-RNTI for user equipments in RRC_CONNECTED mode or the unique 48-bit user equipment identity if the user equipments are in RRC_IDLE mode. In case of a preamble collision having occurred, i.e. multiple user equipments have sent the same preamble on the same PRACH resource, the colliding user equipments will receive the same T-CRNTI within the random access response and will also collide in the same uplink resources when transmitting 503 their scheduled transmission. This may result in interference that no transmission from a colliding user equipment can be decoded at the eNodeB, and the user equipments will restart the random access procedure after having reached maximum number of retransmission for their scheduled transmission. In case the scheduled transmission from one user equipment is successfully decoded by eNodeB, the contention remains unsolved for the other user equipments.

For resolution of this type of contention, the eNode B sends 504 a contention resolution message addressed to the C-RNTI or Temporary C-RNTI, and, in the latter case, echoes the 48-bit user equipment identity contained the scheduled transmission. It supports HARQ. In case of collision followed by a successful decoding of the message 3, the HARQ feedback (ACK) is only transmitted by the user equipment which detects its own identity, either C-RNTI or unique user equipment ID. Other UEs understand that there was a collision at step 1 and can quickly exit the current RACH procedure and starts another one.

FIG. 6 is illustrating the contention-free random access procedure of LTE. In comparison to the contention based random access procedure, the contention-free random access procedure is simplified. The eNodeB provides 601 the user equipment with the preamble to use for random access so that there is no risk of collisions, i.e. multiple user equipment transmitting the same preamble. Accordingly, the user equipment is sending 602 the preamble which was signaled by eNodeB in the uplink on a PRACH resource. Since the case that multiple UEs are sending the same preamble is avoided for a contention-free random access, no contention resolution is necessary, which in turn implies that step 504 of the contention based procedure shown in FIG. 5 can be omitted. Essentially a contention-free random access procedure is finished after having successfully received the random access response.

HARQ Protocol Operation for Unicast Data Transmissions

A common technique for error detection and correction in packet transmission systems over unreliable channels is called hybrid Automatic Repeat request (HARQ). Hybrid ARQ is a combination of Forward Error Correction (FEC) and ARQ.

If a FEC encoded packet is transmitted and the receiver fails to decode the packet correctly (errors are usually checked by a CRC (Cyclic Redundancy Check)), the receiver requests a retransmission of the packet In LTE there are two levels of re-transmissions for providing reliability, namely, HARQ at the MAC layer and outer ARQ at the RLC layer. The outer ARQ is required to handle residual errors that are not corrected by HARQ that is kept simple by the use of a single bit error-feedback mechanism, i.e. ACK/NACK. An N-process stop-and-wait HARQ is employed that has asynchronous re-transmissions in the downlink and synchronous re-transmissions in the uplink. Synchronous HARQ means that the re-transmissions of HARQ blocks occur at pre-defined periodic intervals. Hence, no explicit signaling is required to indicate to the receiver the retransmission schedule. Asynchronous HARQ offers the flexibility of scheduling re-transmissions based on air interface conditions. In this case some identification of the HARQ process needs to be signaled in order to allow for a correct combing and protocol operation. In 3GPP, HARQ operations with eight processes is used in LTE Rel. 8. The HARQ protocol operation for Downlink data transmission will be similar or even identical to HSDPA.

In uplink HARQ protocol operation there are two different options on how to schedule a retransmission. Retransmissions are either scheduled by a NACK, synchronous non-adaptive retransmission, or explicitly scheduled by a PDCCH, synchronous adaptive retransmissions. In case of a synchronous non-adaptive retransmission the retransmission will use the same parameters as the previous uplink transmission, i.e. the retransmission will be signaled on the same physical channel resources respectively uses the same modulation scheme. Since synchronous adaptive retransmissions are explicitly scheduled via PDCCH, the eNode B has the possibility to change certain parameters for the retransmission. A retransmission could be for example scheduled on a different frequency resource in order to avoid fragmentation in the uplink, or the eNode B could change the modulation scheme or alternatively indicate user equipment what redundancy version to use for the retransmission. It should be noted that the HARQ feedback (ACK/NACK) and PDCCH signaling occurs at the same timing. Therefore user equipment only needs to check once whether a synchronous non-adaptive retransmission is triggered, only NACK is received, or whether the eNode B requests a synchronous adaptive retransmission, i.e. PDCCH is signaled.

L1/L2 Control Signaling

In order to inform the scheduled users about their allocation status, transport format and other data related information (e.g. HARQ) L1/L2 control signaling needs to be transmitted on the downlink along with the data. The control signaling needs to be multiplexed with the downlink data in a sub-frame (assuming that the user allocation can change from sub-frame to sub-frame). Here, it should be noted, that user allocation might also be performed on a TTI (Transmission Time Interval) basis, where the TTI length is a multiple of the sub-frames. The TTI length may be fixed in a service area for all users, may be different for different users, or may even by dynamic for each user. Generally, then the L1/2 control signaling needs only be transmitted once per TTI. The L1/L2 control signaling is transmitted on the Physical Downlink Control Channel (PDCCH). It should be noted that assignments for uplink data transmissions, uplink grants, are also transmitted on the PDCCH.

Generally, the PDCCH information sent on the L1/L2 control signaling may be separated into the Shared Control Information (SCI) and Dedicated Control Information (DCI).

Shared Control Information (SCI)

Shared Control Information (SCI) carries so-called Cat 1 information. The SCI part of the L1/L2 control signaling contains information related to the resource allocation (indication). The SCI typically contains the following information:

User identity, indicating the user which is allocated

RB allocation information, indicating the resources (Resource Blocks, RBs) on which a user is allocated. Note, that the number of RBs on which a user is allocated can be dynamic.

Duration of assignment (optional) if an assignment over multiple sub-frames (or TTIs) is possible Depending on the setup of other channels and the setup of the Dedicated Control Information (DCI), the SCI may additionally contain information such as ACK/NACK for uplink transmission, uplink scheduling information, information on the DCI (resource, MCS, etc.).

Dedicated Control Information (DCI)

Dedicated Control Information (DCI) carries the so-called Cat 2/3 information. The DCI part of the L1/L2 control signaling contains information related to the transmission format (Cat 2) of the data transmitted to a scheduled user indicated by Cat 1. Moreover, in case of application of (hybrid) ARQ it carries HARQ (Cat 3) information. The DCI needs only to be decoded by the user scheduled according to Cat 1. The DCI typically contains information on:

- Cat 2: Modulation scheme, transport-block (payload) size (or coding rate), MIMO related information, etc. Note, either the transport-block (or payload size) or the code rate can be signaled. In any case these parameters can be calculated from each other by using the modulation scheme information and the resource information (number of allocated RBs).
- Cat 3: HARQ related information, e.g. hybrid ARQ process number, redundancy version, retransmission sequence number L1/L2 Control Signaling Information for Downlink Data Transmission Along with the downlink packet data transmission, L1/L2 control signaling is transmitted on a separate physical channel (PDCCH). This L1/L2 control signaling typically contains information on:

- The physical channel resource(s) on which the data is transmitted (e.g. subcarriers or subcarrier blocks in case of OFDM, codes in case of CDMA). This information allows the user equipment (receiver) to identify the resources on which the data is transmitted.
- The transport Format, which is used for the transmission. This can be the transport block size of the data (payload size, information bits size), the MCS (Modulation and Coding Scheme) level, the Spectral Efficiency, the code rate, etc. This information (usually together with the resource allocation) allows the user equipment (receiver) to identify the information bit size, the modulation scheme and the code rate in order to start the demodulation, the de-rate-matching and the decoding process. In some cases the modulation scheme maybe signaled explicitly.
- HARQ information:
  - Process number: Allows the user equipment to identify the HARQ process on which the data is mapped.
  - Sequence number or new data indicator: Allows the user equipment to identify if the transmission is a new packet or a retransmitted packet.
  - Redundancy and/or constellation version: Tells the user equipment, which hybrid ARQ redundancy version is used (required for de-rate-matching) and/or which modulation constellation version is used (required for demodulation)
- user equipment Identity (user equipment ID): Tells for which user equipment the L1/L2 control signaling is intended for. In typical implementations this information is used to mask the CRC of the L1/L2 control signaling in order to prevent other user equipments to read this information.

L1/L2 Control Signaling Information for Uplink Data Transmission

To enable an uplink packet data transmission, L1/L2 control signaling is transmitted on the downlink (PDCCH) to tell the user equipment about the transmission details. This L1/L2 control signaling typically contains information on:

- The physical channel resource(s) on which the user equipment should transmit the data (e.g. subcarriers or subcarrier blocks in case of OFDM, codes in case of CDMA).
- The transport format, the user equipment should use for the transmission. This can be the transport block size of the data (payload size, information bits size), the MCS (Modulation and Coding Scheme) level, the Spectral Efficiency, the code rate, etc. This information (usually together with the resource allocation) allows the user equipment (transmitter) to pick the information bit size, the modulation scheme and the code rate in order to start the modulation, the rate-matching and the encoding process. In some cases the modulation scheme maybe signaled explicitly.
- Hybrid ARQ information:
  - Process number: Tells the user equipment from which hybrid ARQ process it should pick the data.
  - Sequence number or new data indicator: Tells the user equipment to transmit a new packet or to retransmit a packet.
  - Redundancy and/or constellation version: Tells the user equipment, which hybrid ARQ redundancy version to use (required for rate-matching) and/or which modulation constellation version to use (required for modulation).
- user equipment Identity (user equipment ID): Tells which user equipment should transmit data. In typical implementations this information is used to mask the CRC of the L1/L2 control signaling in order to prevent other user equipments to read this information.

There are several different flavors how to exactly transmit the information pieces mentioned above. Moreover, the L1/L2 control information may also contain additional information or may omit some of the information. E.g.:

- HARQ process number may not be needed in case of a synchronous HARQ protocol.
- A redundancy and/or constellation version may not be needed if Chase Combining is used (always the same redundancy and/or constellation version) or if the sequence of redundancy and/or constellation versions is pre defined.
- Power control information may be additionally included in the control signaling.
- MIMO related control information, such as e.g. pre-coding, may be additionally included in the control signaling.
- In case of multi-codeword MIMO transmission transport format and/or HARQ information for multiple code words may be included.

For uplink resource assignments (PUSCH) signaled on PDCCH in LTE, the L1/L2 control information does not contain a HARQ process number, since a synchronous HARQ protocol is employed for LTE uplink. The HARQ process to be used for an uplink transmission is given by the timing. Furthermore it should be noted that the redundancy version (RV) information is jointly encoded with the transport format information, i.e. the RV info is embedded in the transport format (TF) field. The TF respectively MCS field has for example a size of 5 bits, which corresponds to 32 entries. 3 TF/MCS table entries are reserved for indicating RVs 1, 2 or 3. The remaining MCS table entries are used to signal the MCS level (TBS) implicitly indicating RV0. The size of the CRC field of the PDCCH is 16 bits. Furthermore the L1 control information for uplink resource assignment contain a so-called CQI request bit, which is set by eNodeB in order to instruct the UE to include downlink channel quality information (CQI) within the scheduled uplink transmissions. The CQI information is used by the eNodeB to schedule downlink data transmissions. The CQI request bit allows the eNodeB the poll information on UE's downlink channel conditions.

For downlink assignments (PDSCH) signaled on PDCCH in LTE the Redundancy Version (RV) is signaled separately in a two-bit field. Furthermore the modulation order information is jointly encoded with the transport format information. Similar to the uplink case there is 5 bit MCS field signaled on PDCCH. Three of the entries are reserved to signal an explicit modulation order, providing no Transport format (Transport block) info. For the remaining 29 entries modulation order and Transport block size info are signaled.

Further Advancements for LTE (LTE-A)

The frequency spectrum for IMT-Advanced was decided at the World Radiocommunication Conference 2007 (WRC-07) last November [4]. Although the overall frequency spectrum for IMT-Advanced was decided, the actual available frequency bandwidth is different according to each region or country. Following the decision on the available frequency spectrum outline, however, standardization of a radio interface started in the 3rd Generation Partnership Project (3GPP). At the 3GPP TSG RAN #39 meeting, the Study Item description on "Further Advancements for E-UTRA (LTE-Advanced)" was approved. The study item covers technology components to be considered for the evolution of E-UTRA, e.g. to fulfill the requirements on IMT-Advanced. Two major technology components which are currently under consideration for LTE-A are described in the following.

LTE-A Support of Wider Bandwidth

Carrier aggregation, where two or more component carriers are aggregated, is considered for LTE-Advanced in order to support wider transmission bandwidths e.g. up to 100 MHz and for spectrum aggregation.

A terminal may simultaneously receive or transmit on one or multiple component carriers depending on its capabilities:

An LTE-Advanced terminal with reception and/or transmission capabilities for carrier aggregation can simultaneously receive and/or transmit on multiple component carriers. There is one Transport Block (in absence of spatial multiplexing) and one HARQ entity per component carrier.

An LTE Rel. 8 terminal can receive and transmit on a single component carrier only, provided that the structure of the component carrier follows the Rel. 8 specifications.

It shall be possible to configure all component carriers LTE Release 8 compatible, at least when the aggregated numbers of component carriers in the uplink and the downlink are same. Consideration of non-backward-compatible configurations of LTE-A component carriers is not precluded LTE-A Support of Relaying Functionality Relaying is considered for LTE-Advanced as a tool to improve e.g. the coverage of high data rates, group mobility, temporary network deployment, the cell-edge throughput and/or to provide coverage in new areas.

The relay node is wirelessly connected to radio-access network via a donor cell. The connection can be inband, in which case the network-to-relay link share the same band with direct network-to-user equipment links within the donor cell. Rel. 8 user equipments should be able to connect to the donor cell in this case.

outband, in which case the network-to-relay link does not operate in the same band as direct network-to-user equipment links within the donor cell With respect to the knowledge in the user equipment, relays can be classified into transparent, in which case the user equipment is not aware of whether or not it communicates with the network via the relay.

non-transparent, in which case the user equipment is aware of whether or not it is communicating with the network via the relay.

Depending on the relaying strategy, a relay may be part of the donor cell control cells of its own In the case the relay is part of the donor cell, the relay does not have a cell identity of its own (but may still have a relay ID). At least part of the RRM is controlled by the eNodeB to which the donor cell belongs, while parts of the RRM may be located in the relay. In this case, a relay should preferably support also LTE Rel. 8 user equipments. Smart repeaters, decode-and-forward relays and different types of L2 relays are examples of this type of relaying.

In the case the relay is in control of cells of its own, the relay controls one or several cells and a unique physical-layer cell identity is provided in each of the cells controlled by the relay. The same RRM mechanisms are available and from a user equipment perspective there is no difference in accessing cells controlled by a relay and cells controlled by a "normal" eNodeB. The cells controlled by the relay should support also LTE Rel. 8 user equipments. Self-backhauling (L3 relay) uses this type of relaying.

In FIG. 4 an exemplary LTE-A system is shown which utilizes relay nodes (RN). The wireless interface between eNode B and RN, which connects a RN with the radio access network, is referred to as S1 interface.

For 3GPP LTE (Rel. 8) it is required that the user equipment can perform an IDLE-to-ACTIVE mode transition within 100 ms, i.e. the initial access should be established within 100 ms. For 3GPP LTE (Rel. 8) this delay requirement can be fulfilled. For 3GPP LTE-A (Rel. 10) however the overall control plane latency, i.e. IDLE-to-ACTIVE transition, shall be significantly decreased compared to EPS (Evolved Packet System) 3GPP LTE (Rel. 8). The desired target for transition time from RRC_IDLE mode-to-RRC_CONNECTED mode currently considered is about 50 ms, which is however not achievable for cell edge user equipments with the currently specified contention based RACH procedure of 3GPP LTE (Rel. 8)

SUMMARY OF THE INVENTION

One object of the invention is to suggest a fast random access procedure for use in a mobile communication system.

One aspect of the invention is therefore proposing a parallelization of the RRC connection setup between mobile terminal and its base station and the establishment of the base station connection (user plane radio access bearer) towards the core network of the mobile communication system. The inventors recognized that one problem in implementing such parallelization may be the size of the first scheduled transmission by a mobile terminal in a random access procedure that is actually informing the base station on the cause of the connection establishment. For example for power limited mobile terminals (e.g. mobile terminal at the cell edge) the size of the first scheduled transmission can be very limited so that not sufficient information can be sent by mobile terminal to allow provide all information for RRC connection establishment and the parallel establishment of the S1 connection which initiates the access stratum security activation and radio bearer establishment.

Therefore it is another (alternative) object of the invention to suggest a random access procedure that allows more information to be conveyed in the first scheduled transmission of the random access procedure.

At least one of these objects is solved by the subject matter of the independent claims. Advantageous embodiments are subject to the dependent claims.

To solve the second object of the invention, another aspect of the invention is to propose a mechanism to signal to the mobile terminal which transmission mode should be used for the first scheduled transmission. The transmission mode is indicated by the base station in the random access response sent to the mobile terminal in response to receiving a random access preamble from the mobile terminal at the base station.

One embodiment of the invention is therefore relating to a random access response message for transmission from a base station to a mobile station in a random access procedure. The random access response message comprises a resource grant field for granting resources to a mobile terminal for a scheduled uplink transmission, and further a transmission mode indicator indicating the transmission mode for the scheduled uplink transmission.

In one example, the transmission mode indicator is indicating whether or not a TTI bundling mode is to be used by the mobile terminal for the scheduled uplink transmission. In the TTI bundling mode, the mobile terminal may for example send multiple redundancy versions of the same transport block within a number of consecutive transmission time intervals on the granted resources. As a "bundle" of transmission is sent in consecutive transmission time intervals (TTIs), the combining gain achieved by combining the individual transmissions of the (redundancy versions of the) transport block in the decoding process allows to significantly increase the probability of successful decoding while further reducing the retransmission delay when utilizing HARQ for the scheduled transmission.

In one exemplary embodiment of the invention, the transmission mode indicator is contained in a separate field of the random access response message. In one example, this separate field could be a part of the resource grant field containing the grant for the scheduled uplink transmission.

In another exemplary embodiment of the invention, the resource grant field comprises a flag. Depending on whether contention based random access or non-contention based random access is performed, this flag is interpreted differently. If the random access procedure is a contention based random access procedure, the flag is signalling the transmission mode indicator. If the random access procedure is a non-contention based random access procedure, the flag is a CQI request bit for requesting a CQI report from the mobile terminal According to another embodiment of the invention, the random access response message further comprises a timing advance command to synchronize transmissions of the mobile terminal and the base station and an assignment of a Temporary Cell Radio Network Temporary Identifier (Temporary CRNTI).

Another embodiment of the invention is providing a random access procedure for use in a mobile communication system. In this random access procedure a base station transmits a random access response in response to receiving a random access preamble from a mobile terminal. This random access response message comprises a grant for a scheduled transmission by the mobile terminal and an indication on the uplink transmission mode for the scheduled transmission. In one example, the random access response message is a message according to one of the different embodiments described herein.

In a further embodiment of the invention, as part of the random access procedure, the mobile terminal transmits the random access preamble to the base station. The random access preamble thereby indicates to the base station the transmission mode requested by the mobile terminal for the scheduled uplink transmission. In one example, the preamble is thus signalling to the base station whether the mobile terminal wants to use TTI bundling for the scheduled transmission or not.

In the random access procedure according to a variation of this embodiment, the mobile terminal is selecting the random access preamble out of a plurality of predefined preambles. The predefined preambles are assigned to different groups associated to respective requested transmission modes for the scheduled uplink transmission. For example, the predefined preambles are assigned to different groups associated to respective requested transmission modes for the scheduled uplink transmission and to further indicate the mobile terminal's compatibility with a specific release of the mobile communication system. In other words, the indication of the transmission mode can be considered a release indication, i.e. an indication of the compatibility of the mobile terminal to a specific mobile communication system. For instance, when using the invention in a 3GPP based communication system supporting 3GPP LTE (Rel. 8) and 3GPP LTE-A (Rel. 10), the transmission mode indicator/release indicator could indicate whether the user equipment is supporting 3GPP LTE-A (Rel. 10) or not.

In another embodiment of the invention, the random access procedure further comprises transmitting a scheduled uplink transmission from the mobile station to the base station according to the transmission mode indicated in the random access response message.

In this exemplary embodiment, the transmission mode may be for example a TTI bundling mode. The mobile terminal is therefore transmitting different redundancy versions of the same transport block within a number of consecutive transmission time intervals on the resources granted in the random access response message.

In another embodiment of the invention, the scheduled uplink transmission comprises a RRC connection request and a non-access stratum service request message. Accordingly, the base station can perform, in response to the RRC connection request, respectively, the non-access stratum service request, a RRC connection setup on the radio interface in parallel to the initial security activation and radio bearer establishment. Strictly speaking the RRC connection setup procedure and the initial security activation and radio bearer establishment procedure are not part of the random access procedure, but the random access procedure can be considered the initial procedure performed in a mobile terminal transiting from idle mode to connected mode, which is followed by RRC connection establishment and initial security activation and radio bearer establishment.

In one exemplary implementation of this embodiment, the connection setup procedure is setting up a RRC connection between the base station and the mobile terminal, and the non-access stratum procedure is setting up a connection between the base station and the core network node in the mobile communication system's core network. In a 3GPP LTE or LTE-A system, the "connection" between the base station and the core network node in the mobile communication system's core network is a bearer between the base station (eNodeB) and its serving gateway (SGW) in the core network on the so-called S1 interface. Typically, such S1 connection is established by the mobility management entity (MME) serving the mobile terminal (user equipment), which handles the control plane signalling.

In a further embodiment of the invention, the random access procedure is performed by mobile terminals establishing an RRC connection to the network.

Another embodiment of the invention is providing a base station for performing a random access procedure in a mobile communication system. The base station comprises a receiver for receiving a random access preamble from a mobile terminal. Furthermore, the base station is equipped with a transmitter for transmitting a random access response to the mobile terminal in response to receiving a random access preamble. This random access response message comprises a grant for a scheduled transmission by the mobile terminal and an indication on the uplink transmission mode for the scheduled transmission.

The base station's receiver may be further operable to receive—in response to the random access response—a scheduled uplink transmission from the mobile terminal according to the transmission mode indicated in the random access response. This scheduled uplink transmission could for example comprise a RRC connection request and a non-access stratum service request and the base station will perform a RRC connection setup procedure in parallel to the establishment of the S1 connection between base station and core network in response to this scheduled uplink transmission.

A further embodiment of the invention provides a mobile terminal for performing a random access procedure in a mobile communication system. The mobile terminal comprises a transmitter for transmitting a random access preamble to a base station, and a receiver for receiving a random access response from the base station in response to receiving a random access preamble. The random access response message comprises a grant for a scheduled transmission by the mobile terminal and an indication on the uplink transmission mode for the scheduled transmission.

The mobile terminal's transmitter may be optionally further adapted to transmit in response to the random access response a scheduled uplink transmission from the mobile terminal according to the transmission mode indicated in the random access response.

In another variation of this embodiment of the invention, the scheduled uplink transmission comprises a RRC connection request and a non-access stratum service request.

Another embodiment of the invention relates to a computer-readable medium storing instructions that, when executed by a processor of a base station, causes the base station to perform a random access procedure in a mobile communication system, by receiving a random access preamble from a mobile terminal, and transmitting a random access response to the mobile terminal in response to receiving a random access preamble, wherein the random access response message comprises a grant for a scheduled transmission by the mobile terminal and an indication on the uplink transmission mode for the scheduled transmission.

Regarding the mobile terminal side, another embodiment of the invention provides a computer-readable medium storing instructions that, when executed by a processor of a mobile terminal, causes the mobile terminal to perform a random access procedure in a mobile communication system, by transmitting a random access preamble to a base station, and receiving a random access response from the base station in response to receiving a random access preamble, wherein the random access response message comprises a grant for a scheduled transmission by the mobile terminal and an indication on the uplink transmission mode for the scheduled transmission.

BRIEF DESCRIPTION OF THE FIGURES

In the following the invention is described in more detail in reference to the attached figures and drawings. Similar or corresponding details in the figures are marked with the same reference numerals.

DETAILED DESCRIPTION OF THE INVENTION

The following paragraphs will describe various embodiments of the invention. For exemplary purposes only, most of the embodiments are outlined in relation to an orthogonal single-carrier uplink radio access scheme according to 3GPP LTE (Rel. 8) and LTE-A (Rel. 10) mobile communication systems discussed in the Technical Background section above. It should be noted that the invention may be advantageously used for example in connection with a mobile communication system such as 3GPP LTE (Rel. 8) and LTE-A (Rel. 10) communication systems previously described, but the invention is not limited to its use in this particular exemplary communication network.

The explanations given in the Technical Background section above are intended to better understand the mostly 3GPP LTE (Rel. 8) and LTE-A (Rel. 10) specific exemplary embodiments described herein and should not be understood as limiting the invention to the described specific implementations of processes and functions in the mobile communication network. Nevertheless, the improvements to the random access procedure proposed herein may be readily applied in the architectures/systems described in the Technical Background section and may in some embodiments of the invention also make use of standard and improved procedures of theses architectures/systems.

Figure 8:
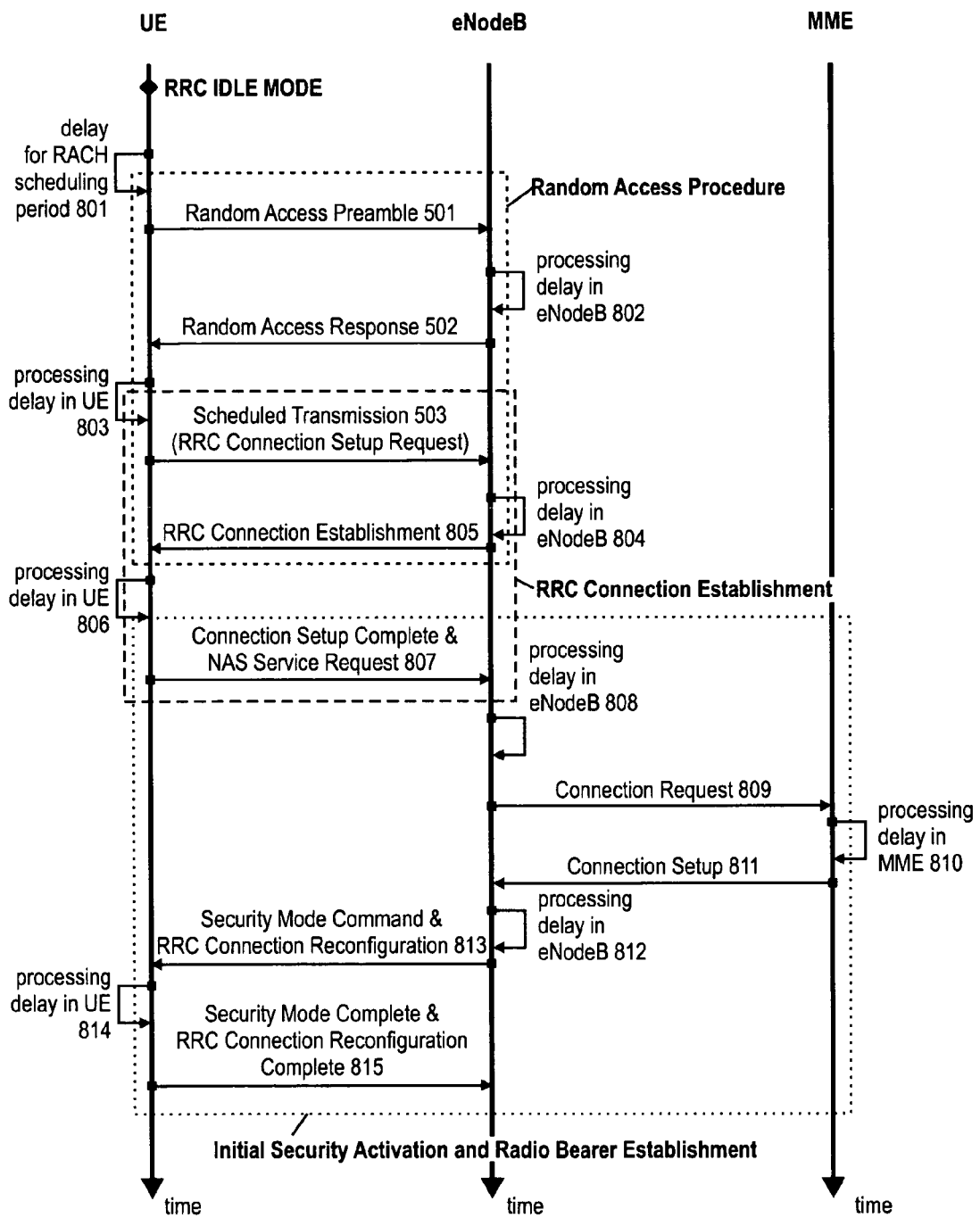
FIG. 8 shows the signaling messages of an initial access procedure, i.e. transition from RRC_IDLE state to RRC_CONNECTED state, in a 3GPP LTE (Rel. 8) system.

FIG. 8 shows the procedures that need to be performed by a user equipment (UE) in a 3GPP LTE (Rel. 8) system when transiting from RRC IDLE mode to RRC CONNECTED mode. This procedure includes a Random Access Procedure, subsequently a RRC Connection establishment procedure and thereupon an initial security activation and radio bearer establishment procedure. FIG. 8 also exemplarily indicates that different delays (801, 802, 803, 804, 806, 808, 810, 812 and 814) in UE, eNodeB and MME for processing the respective messages. Initially, the UE is assumed to be in RRC IDLE mode.

Figure 1:
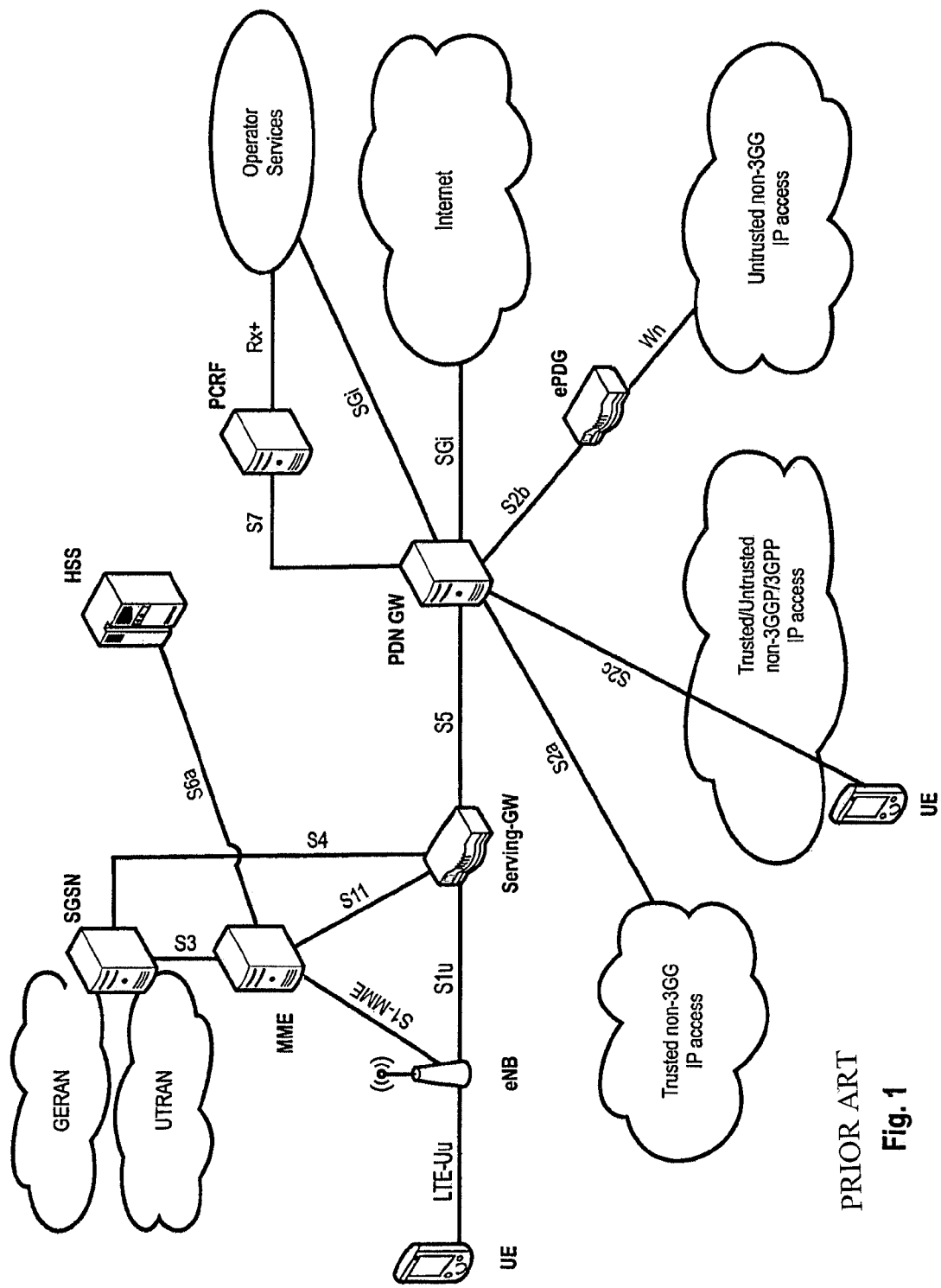
FIG. 1 shows an exemplary architecture of a 3GPP LTE system.
Figure 2:
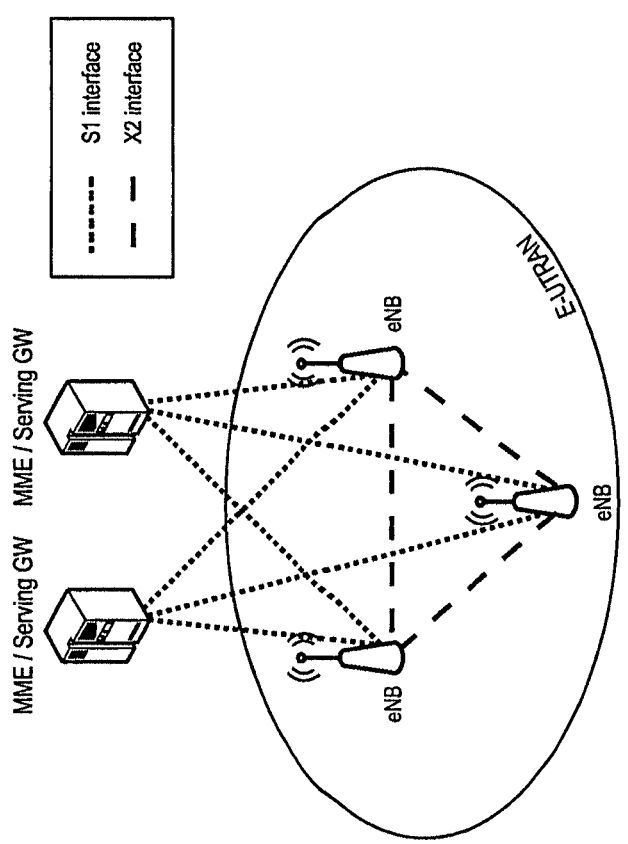
FIG. 2 shows an exemplary overview of the overall E-UTRAN architecture of LTE.
Figure 3:
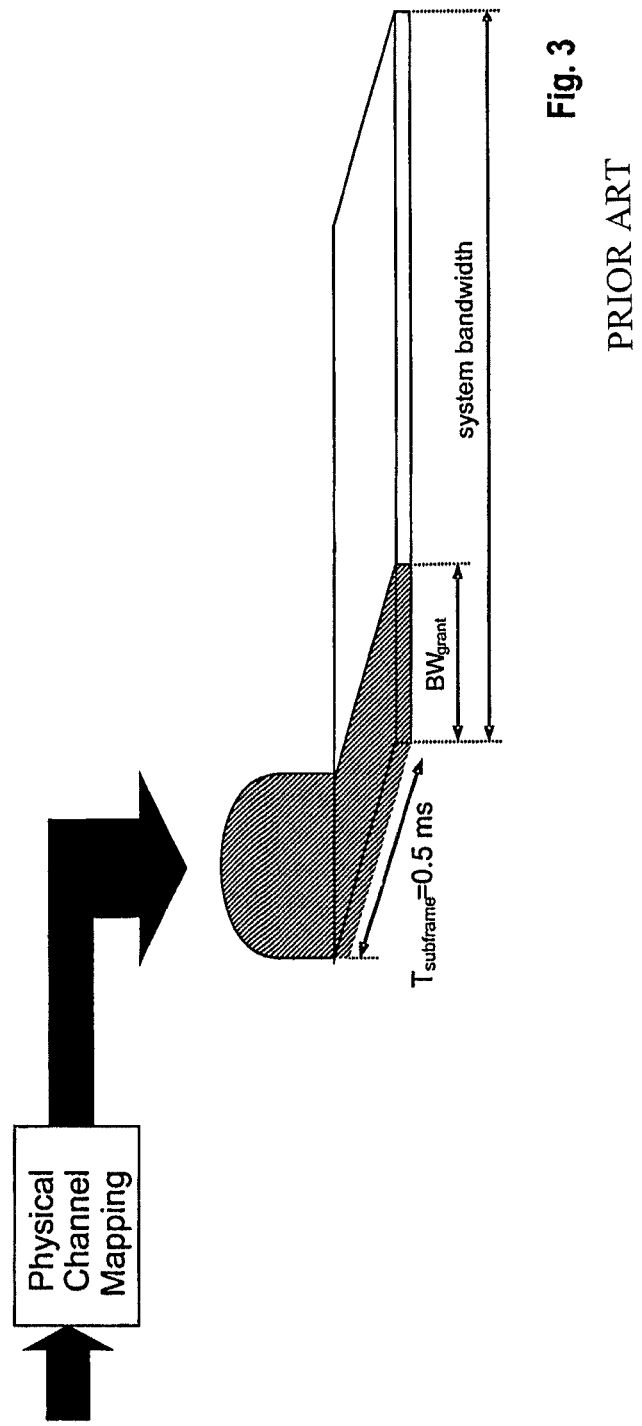
FIG. 3 show an exemplary localized allocation of the uplink bandwidth in a single carrier FDMA scheme.
Figure 4:
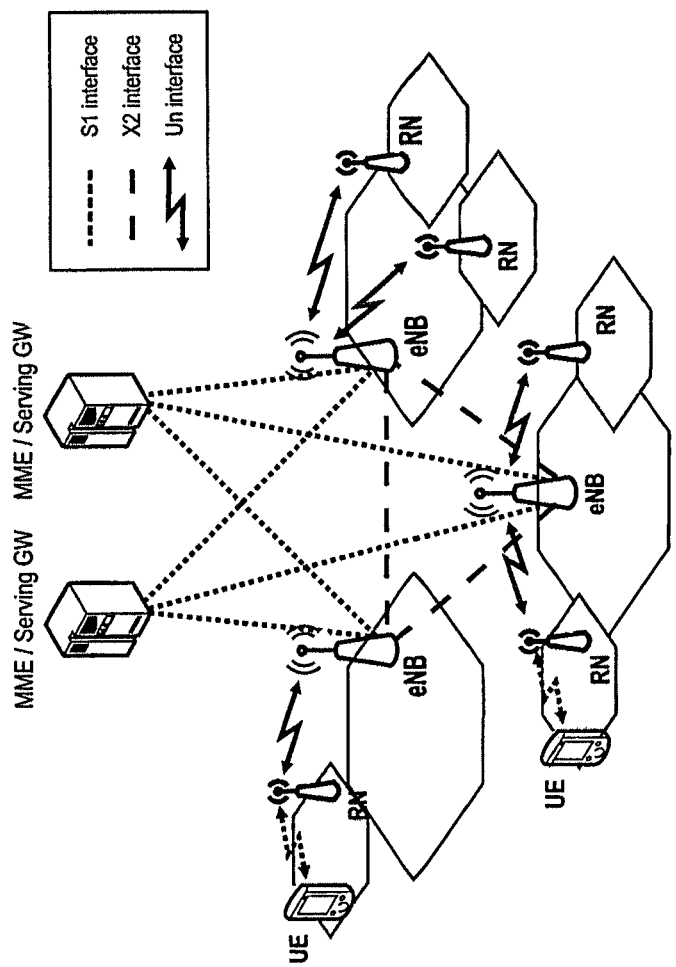
FIG. 4 shows an exemplary overview of the overall E-UTRAN architecture of LTE-A including several relay nodes (RN)
Figure 5:
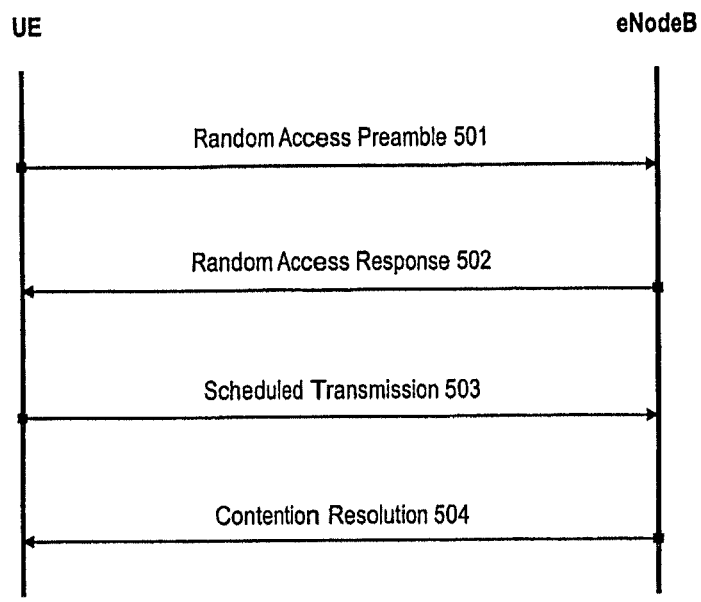
FIG. 5 shows the signaling messages of a contention based random access procedure in a 3GPP LTE (Rel. 8) system.
Figure 6:
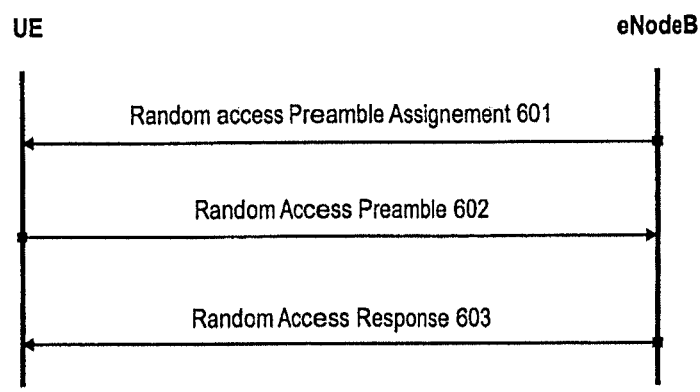
FIG. 6 shows the signaling messages of a contention free random access procedure in a 3GPP LTE (Rel. 8) system.

The Random Access Procedure corresponds to the procedure described with respect to FIG. 5 previously herein. In the scheduled transmission, the UE indicates that it wishes to setup a RRC connection by including a RRC Connection Setup Request to the transmission. In response to this RRC Connection Setup Request, the eNodeB sends 805 a RRC Connection Establishment message to the UE for setting up the signaling connection (control plane) between the UE and the eNodeB including the initial radio resource configuration including SRB1 (signaling radio bearer 1). Furthermore, it should be noted that the RRC Connection Establishment message acts as the contention resolution message (as shown in FIG. 5, step 504).

The UE responds by sending 807 a message to inform the eNodeB on the successful configuration of the control plane by signaling RRC Connection Establishment Complete. In addition to the RRC Connection Setup Complete, the message is further comprising the initial uplink non-access stratum message, a service request message (for instance to request user plane radio resources for services like a VoIP communication, etc.), which is referred to as the NAS Service Request. The purpose of the service request procedure is to transfer the ECM mode from ECM-IDLE mode to ECM-CONNECTED mode (ECM=EPS Connection Management) and establish the radio bearer in the Uu interface and S1 bearers when uplink user data or signaling is to be sent.

In response to this NAS Service Request, the eNode B starts establishing the S1 connection which triggers the access stratum security activation and the establishment of SRB2 (signaling radio bearer 2) and one or more data radio bearers (Initial Security Activation and Radio Bearer Establishment). The eNodeB initiates the establishment of the S1 connection (eNodeB ↔ core network) by sending 809 a Connection Request to the MME. The eNodeB sends the Security Mode Command message to activate the integrity protection and ciphering. This message, which is integrity protected but not ciphered, indicates which algorithms shall be used. The UE verifies the integrity protection of the Security Mode Control message and, if its integrity can be confirmed, it configures lower layers to apply integrity protection and ciphering to all subsequent messages (with the exception that ciphering is not applied to the response message, i.e. Security Mode Complete message). The eNodeB also sends 813 a RRC Connection Reconfiguration message including a radio resource configuration used to establish the second signaling bearer (for control plane traffic) and one or more dedicated radio bearers (for user plane traffic). This message may also include other information such as a piggybacked NAS message or a measurement configuration. The UE returns 815 the RRC Connection Reconfiguration Complete message to confirm configuration of the bearers.

In FIG. 8, some messages may not be unambiguously attributed to one of the different procedures performed. For example, the scheduled transmission in step 503 is as such a part of the random access procedure. The content thereof, i.e. the RRC Connection Request is however already part of the RRC Connection Setup procedure. Also the RRC Connection Establishment message in step 805 is on the one hand starting the RRC Connection Establishment procedure, but is also ending the random access procedure as it also comprises the contention resolution of the random access procedure. Similarly, the RRC Connection Reconfiguration Complete message is ending the RRC Connection Establishment procedure, while the NAS Service Request is as such already part of the Initial Security Activation and Radio Bearer Establishment procedure. The different dashed boxes indicating the different procedures are therefore partly overlapping on some messages.

As indicated above, one aspect of the invention is to reduce the overall delay of the RRC IDLE mode-to-RRC CONNECTED mode transition as exemplarily outlined for the 3GPP LTE (Rel. 8) procedure above. One means to achieve this is to send a Non-Access Stratum (NAS) Service Request together with the RRC Connection Request in first scheduled transmission of a mobile terminal during the random access procedure. This allows to establish the RRC level connection between the mobile terminal and the base station and the radio access bearer for the requested service between base station and the core network in parallel.

For example, in an exemplary implementation within a 3GPP based system, such as for example 3GPP LTE (Rel. 8) or LTE-A (Rel. 10) signaling of the Non-Access Stratum (NAS) Service Request together with the RRC Connection Request during the random access procedure would allow to setup the S1 interface between the eNode B and the Serving Gateway (SGW) of a user equipment in parallel to the RRC connection setup on the air interface between the user equipment and the eNode B (i.e. the Uu interface), which in turn reduces the delay significantly.

Figure 9:
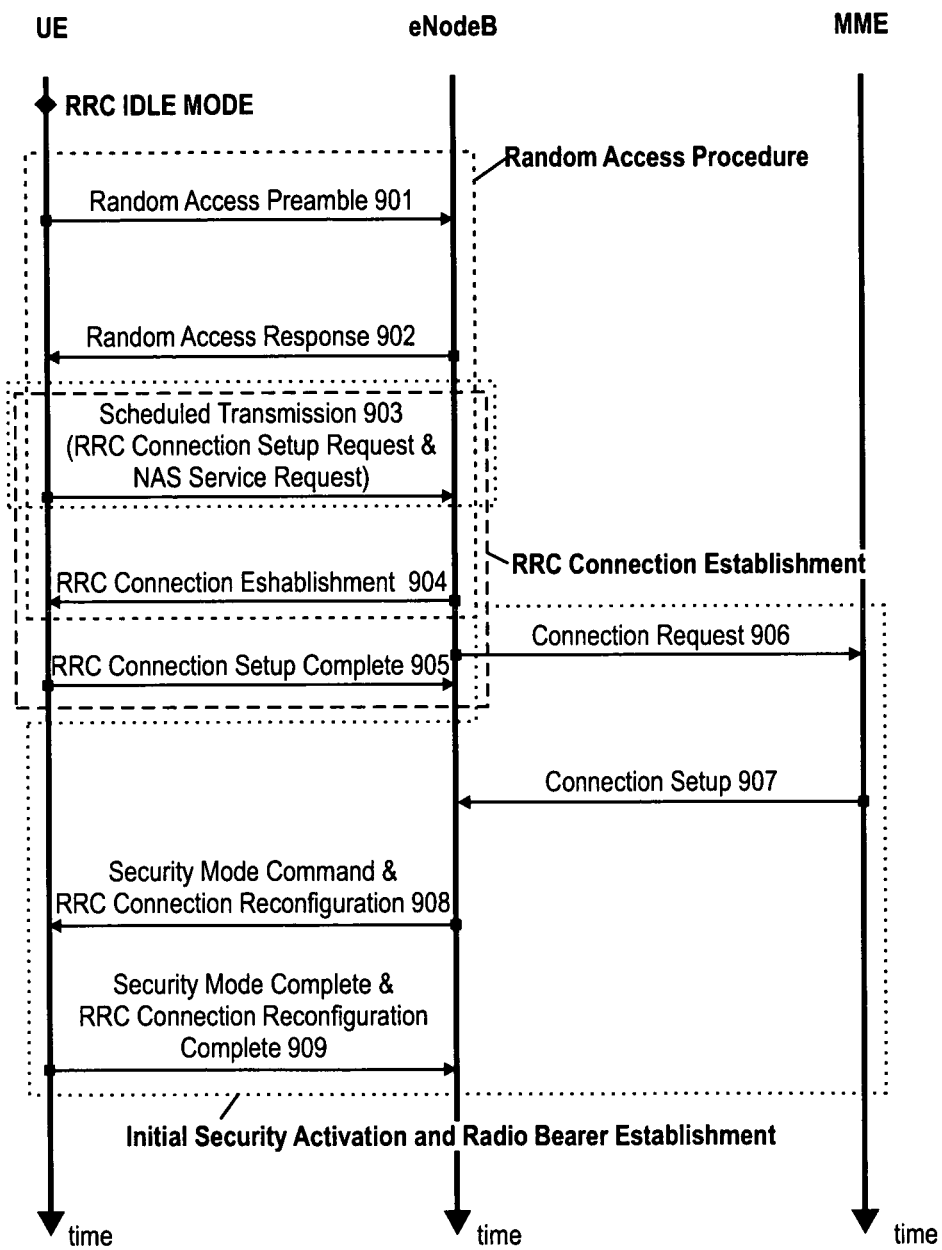
FIG. 9 shows the signaling messages of an initial access procedure, i.e. transition from RRC_IDLE state to RRC_CONNECTED, according to an exemplary embodiment of the invention.

FIG. 9 shows a signaling procedure for an RRC IDLE mode-to-RRC CONNECTED mode transition including a random access procedure according to an exemplary embodiment of the invention, where the setup of the S1 interface is performed in parallel to RRC connection setup.

Similar to the procedure described with respect to FIG. 5 and FIG. 9 above, the UE is in idle mode first and is initiating the Random Access Procedure by transmitting 901 a Random Access Preamble to the eNodeB which is responding with sending 902 a Random Access Response (as described previously). In the transmission scheduled by the Random Access Response, according to this embodiment of the invention, the UE transmits 903 the RRC Connection Setup Request and a NAS Service Request simultaneously to the eNodeB, i.e. concatenation of RRC Connection Setup Request and NAS Service Request message. Accordingly, the eNodeB may now start to perform a RRC Connection Setup procedure and a NAS procedure (Initial Security Activation and Radio Bearer Establishment) in parallel, which significantly reduces the delay of the overall RRC IDLE mode-to-RRC CONNECTED mode transition of the UE. The RRC Connection Setup and the NAS procedure correspond to the procedures as explained with respect to FIG. 8 above, except for the RRC Connection Setup being performed in parallel to the Connection Request 906 (and the Connection Setup received 907 by the eNodeB in response thereto) and no NAS Service Request being signaled together with the RRC Connection Setup Complete in step 905.

As in FIG. 8, some messages of FIG. 9 may not be unambiguously attributed to one of the different procedures performed. Again, the scheduled transmission in step 903 is as such a part of the random access procedure. The content thereof, i.e. the RRC Connection Request is however already part of the RRC Connection Setup procedure while the NAS Service Request can be considered to belong to the Initial Security Activation and Radio Bearer Establishment procedure. The different dashed boxes indicating the different procedures are therefore partly overlapping on some messages.

One bottleneck of the 3GPP LTE (Rel. 8) contention based random access procedure is the limited size of the first scheduled uplink transmission (see step 503 in FIG. 5 and FIG. 8). Since power control is not really working at this point of time, only a small number of bits can be transmitted within this message without requiring too many HARQ retransmissions which would in turn delay the whole random access procedure (RACH procedure). Investigations in the 3GPP RAN Working Group #1 have shown that the minimum size of the first scheduled transmission in the contention based random access procedure in 3GPP LTE Rel. 8 is 56 bits, already considering the cell coverage and the UE power limitation. These 56 bits are basically representing the "worst case" scenario, i.e. a user equipment at the cell-edge which is power limited. Furthermore it should be noted that two HARQ retransmissions were assumed in order to support a message size of 56 bits.

Considering the initial access scenario, i.e. RRC IDLE state to RRC CONNECTED transition, the limited size of the first scheduled transmission in the contention based random access procedure which can be only supported by for example UEs located at the cell edge brings some disadvantages which will be explained in more detail in the following. There is a certain delay requirement for the RRC IDLE-to-RRC CONNECTED transition which needs to be fulfilled by a user equipment. For Rel. 8 this requirement is 100 ms, i.e. the initial access (i.e. the transition from idle mode to connected mode) should be established within 100 ms. For 3GPP LTE (Rel. 8) this delay requirement can be fulfilled. For 3GPP LTE-A (Rel. 10) however the overall control plane activation latency, i.e. RRC IDLE-to-RRC CONNECTED mode transition, shall be significantly decreased compared to 3GPP LTE (Rel. 8). The desired target for transition time from Idle-mode to Connected-mode currently considered is about 50 ms.

As explained with respect to FIG. 9 above, one aspect of the invention is to reduce the overall delay in the RRC IDLE-to-RRC CONNECTED mode transition by performing the RRC Connection Setup and the S1 connection establishment in parallel, which is requiring that the user equipment communicates the NAS Service Request to the eNodeB as soon as possible, preferably as part of the Random Access Procedure (see step 903 of FIG. 9). In order to be able to send NAS Service Request together with the RRC Connection Request in the scheduled transmission of step 903, the minimum message size of this transmission needs to be extended. Allocating only 56 bits for the scheduled transmission as in 3GPP LTE (Rel. 8), it is not possible to convey also NAS Service Request together with the RRC Connection Request. However simply assigning more bandwidth for the scheduled transmission in the random access procedure is not solving this problem for example for power limited UEs due to the decreased power per Resource Element (RE) that would be available to the user equipment and its power limitation.

Therefore, it is another aspect of the invention to suggest an improved random access procedure which allows for increasing the number bits (transport block size) that can be sent with the first scheduled transmission of a mobile terminal during the random access procedure, such that for example, a NAS Service Request can be signaled together with the RRC Connection Request.

Generally, it may be assumed that mobile terminals at the cell border often suffer from uplink power limitations. Sometimes even small amounts of data like e.g. VoIP packets need to be segmented to reach a given target block error rate (BLER). One way to overcome the uplink coverage problem in such case is to segment the packet at the RLC layer (Layer 2) and to use HARQ retransmissions.

In 3GPP LTE and LTE-A networks, the scheduler in eNodeB takes channel conditions into account when selecting a transport block size which should be used by the user equipments for an uplink transmission. Thus power-limited user equipments typically receive only grants for small transport block sizes. If the selected transport block size is even too small to carry e.g. a single VoIP packet and the required RLC/MAC headers, several transport blocks need to be granted. In this case RLC layer segmentation is applied. This approach can be used for both, dynamic and semi-persistent scheduling. However a segmentation of small packets has several drawbacks in terms of overhead. Essentially each separate RLC PDU requires an RLC/MAC header that introduces overhead. Furthermore for each HARQ (re)transmission a L1/L2 control message is needed to grant resources. The high number of required retransmissions leads to a significant load on the L1/L2 control channel.

In order to avoid these problems for user equipments in power limited situation in particular with respect to the transport block size of the first scheduled transmission within the random access procedure, another embodiment of the invention is proposing to use an uplink transmission mode, which is referred to as TTI bundling, for the first scheduled transmission of the random access procedure. In this TTI bundling mode several TTIs are bundled together in order to mitigate the uplink coverage issues.

Figure 12:
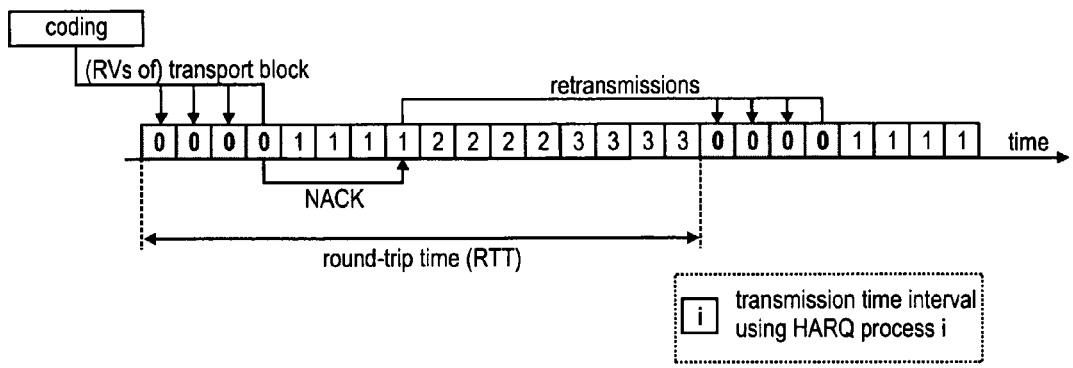
FIG. 12 shows the TTI bundling of a transmission according to an exemplary embodiment of the invention.
Figure 10:
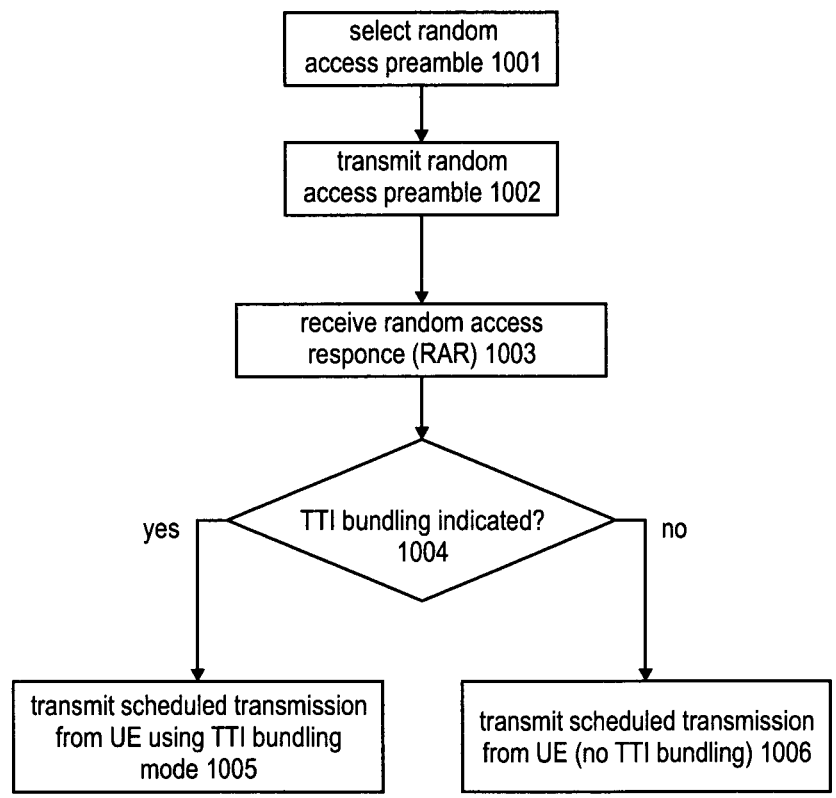
FIGS. 10 & 15 show a flow chart for the operation of a mobile terminal according to different embodiments of the invention, when performing a random access procedure, FIG. 11 show a flow chart for the operation of a base station according to an exemplary embodiment of the invention, when performing a random access procedure.
Figure 11:
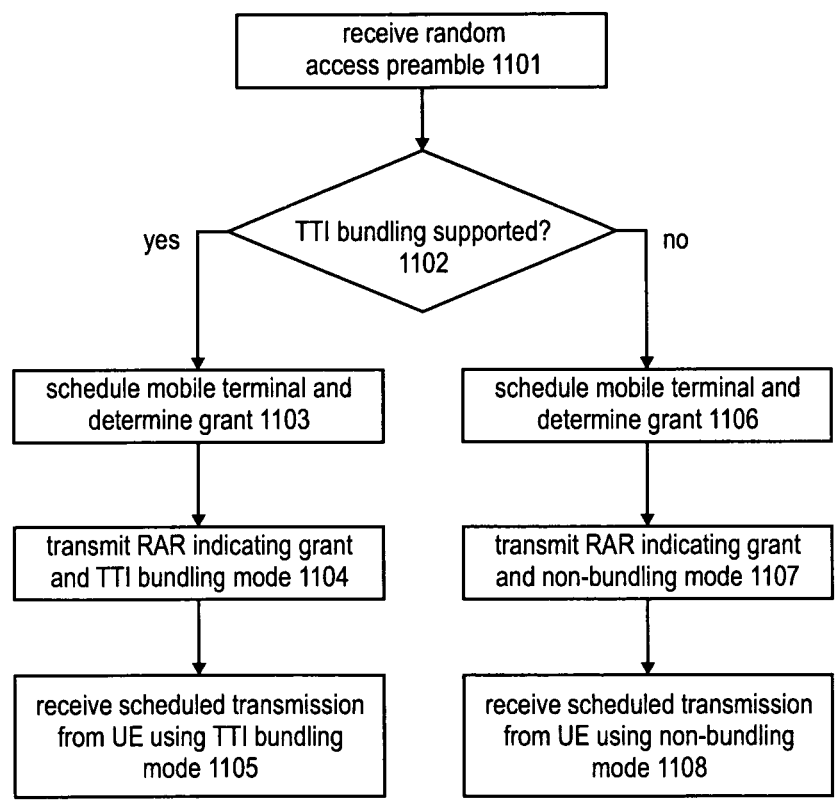

FIG. 12 is exemplarily illustrating a "bundled" transmission of a transport block (corresponding to the first scheduled transmission in the random access procedure, as for example shown in step 903 of FIG. 9; step 1005 in FIG. 10; step 1104 in FIG. 11) according to an exemplary embodiment of the invention. It is assumed for exemplary purposes that 4 consecutive subframes, respectively TTIs are bundled. A single transport block from MAC layer for the first scheduled transmission of the random access procedure is coded and is transmitted repeatedly in four consecutive subframes, i.e. also referred to as TTI bundle, with only one set of control signaling for the whole transmission. In each TTI of the bundle a redundancy version (RV) for the transport block is sent (in the same HARQ process), without waiting for HARQ feedback. In this exemplary embodiment of the invention, non-adaptive retransmissions are used for the transmission in the bundled TTIs. Only when the last transmission of a TTI bundle is received, HARQ feedback (ACK/NACK) is sent and expected. The retransmission of a TTI bundle is also a bundle of individual transmissions of the transport block.

As can be recognized from FIG. 12 the number of HARQ processes may be reduced to 4 in the TTI bundling mode, in comparison to the "normal" operation of non-bundling mode where typically 8 HARQ processes are used for uplink transmissions. Furthermore the HARQ roundtrip time (RTT) is doubled (16 ms) for the TTI bundling mode compared to the non-bundling mode (8 ms).

The TTI bundling mode allows for increasing the transport block size that can be sent even by cell-edge user equipments in comparison to the non-bundling transmission mode. The main reason for this is the additional combining gain achieved by combining the transmissions of the TTI bundle prior to decoding at the receiving node, so that a more aggressive modulation and coding scheme may be used which will effectively lead to an increased transport block size (given a constant number of allocated resource elements). Thus, by using TTI bundling for the first scheduled transmission of the user equipments within the random access procedure, the transport block size may be significantly increased also for cell-edge user equipments such that the first scheduled transmission can convey the RRC connection request and the NAS service request, which in turn facilitates the parallelization of the RRC Connection Setup procedure and the S1 connection setup as outlined previously herein.

A further design consideration for the random access procedure according to a further embodiment of the invention is the handling of user equipments which are implementing earlier releases like for example 3GPP LTE (Rel. 8) for this procedure. For example, when employing the invention in a 3GPP LTE-A (Rel. 10) system it may be desirable that this procedure is compatible with a 3GPP LTE (Rel. 8) procedures, where user equipments will not support the improved random access procedures discussed herein.

Of course, and according to one embodiment of the invention, if no backward compatibility is desired, the communication system could be implemented to use TTI bundling for the first scheduled transmissions of the random access procedure by default, so that respective signalling of the transmission mode would be obsolete in this example.

If however backward compatibility is desired, it may be advantageous that the eNode B is deciding on the transmission mode for the first scheduled transmission. This could also allow the eNode B to avoid bundled transmissions for the first scheduled transmission. For example, the eNode B (its scheduler) could allocate a transport block size for cell-centre user equipments that is large enough to simultaneously send a RRC connection request and a NAS service request, while it uses TTI bundling for cell-edge user equipments performing initial access. Accordingly another embodiment of the invention is proposing a new format for the random access response message that is sent by the base station (e.g. eNodeB in a 3GPP based system) to the mobile terminal (e.g. user equipment (UE) in a 3GPP based system) in response to receiving a random access preamble from same. According to this embodiment, the random access response message comprises a resource grant field for granting resources to a mobile terminal for a scheduled uplink transmission, and a transmission mode indicator indicating the transmission mode for the scheduled uplink transmission. As explained previously, this transmission mode indicator may indicate use of the TTI bundling mode or a backward compatible transmission mode, i.e. a non-bundling mode.

Figure 7:
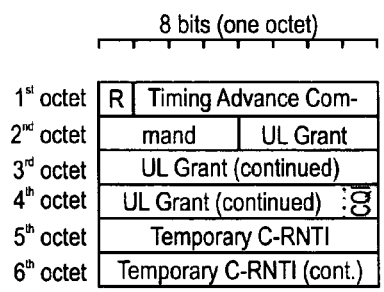
FIG. 7 shows the message format of a Random Access Response message according to a 3GPP LTE (Rel. 8) RACH procedure.

FIG. 7 shows the format of the MAC Random Access Response of 3GPP LTE (Rel. 8). The message is starting with one bit which is unused, i.e. denoted by R (reserved). This unused bit is followed by the Timing Advance Command (11 bits). Next, there is the grant (UL Grant) of the uplink resources for the first scheduled transmission by the user equipment (20 bits), which is followed by the Temporary C-RNTI assigned to the user equipment (16 bits).

Figure 13:
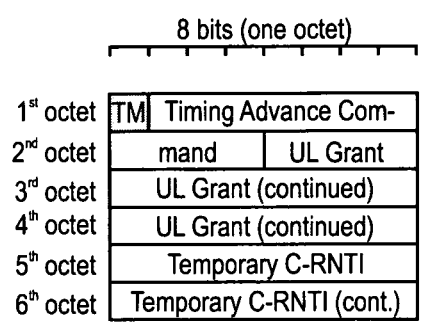
FIGS. 13 & 14 show alternative message formats of a random access response message according to exemplary embodiments of the invention.

In one exemplary embodiment of the invention, it is proposed that the reserved first bit (R) of the 3GPP LTE (Rel. 8) random access response is used for signaling the transmission mode (TM) for the first scheduled transmission by the user equipment. This is exemplified in FIG. 13. FIG. 13 shows the format of the random access response message according to an exemplary embodiment of the invention. The message format in FIG. 13 is essentially corresponding to that of FIG. 7, except for the use of the first bit (TM) in the message to signal the transmission mode. The message format of FIG. 13 may be readily used in a 3GPP LTE (Rel. 10) and ensures backward compatibility with 3GPP LTE (Rel. 8) compatible user equipments that ignore the first bit of the random access response message.

Figure 14:
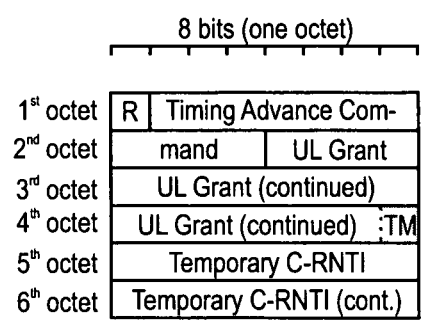

In another embodiment of the invention, another backward compatible definition of the message format for the random access response message is proposed. As indicated in FIG. 7, the 3GPP LTE (Rel. 8) random access response comprises a resource grant field (UL Grant) that is including a CQI request bit (CQI). Similar to the reserved bit (R), a 3GPP LTE (Rel. 8) compatible user equipment performing a contention based random access procedure ignores this bit when processing the random access response message. Hence, for contention based random access, this CQI request bit could be reused for the indication of the transmission mode of the first scheduled transmission. FIG. 14 exemplarily shows the message format of another random access response message according to an exemplary embodiment of the invention for use in a contention based random access procedure. The format is corresponding to that of FIG. 7 except for the reuse of the CQI request bit (CQI) for the transmission mode indicator (TM). Also the message format of FIG. 14 may be readily used in a 3GPP LTE (Rel. 10).

In one further example, it is proposed to use the random access response format of FIG. 7 for 3GPP LTE (Rel. 10) compatible user equipments performing non-contention based random access and for random access of 3GPP LTE (Rel. 8) compatible user equipments, while the random access response format of FIG. 14 is used for 3GPP LTE (Rel. 10) compatible user equipments performing contention based random access. Formulated differently, one could also say that the format of the messages in FIG. 14 and FIG. 7 are the same, but the interpretation/meaning of the flag (here last bit in the UL Grant field) depends on whether contention based random access or non-contention based random access is performed by the user equipment and on the release a user equipment is implementing.

Next, the operation of a mobile terminal and a base station using an improved random access procedure as described herein will be described in further detail with respect to FIG. 10 and FIG. 11.

FIG. 10 shows a flow chart of the exemplary operation of a mobile terminal in a contention based random access procedure according to an embodiment of the invention. The mobile terminal first selects 1001 one out of a plurality of random access preambles for the contention based random access procedure. There may be for example a plurality of preambles predefined in the system or configured by the eNodeB via cell broadcast. Next, the mobile terminal sends 1002 the selected random access preamble to the eNode B to trigger a random access response message from the eNodeB which is received 1003 by the mobile terminal. The random access response message is containing inter alia a resource grant for the first scheduled uplink transmission of the mobile terminal as well as a transmission mode indicator. In one embodiment, the random access response message has a format as shown in FIG. 13 or FIG. 14. In this exemplary embodiment, the transmission mode indicator is a flag (one bit) that—when set (for example flag=1)—that the mobile terminal should send the scheduled uplink transmission using TTI bundling as described with respect to FIG. 12 previously herein. If the transmission mode indicator is not set (for example flag=0), the mobile terminal is instructed to send the first scheduled transmission without TTI bundling, i.e. as a transmission in a single TTI.

The mobile terminal determines 1004, whether the transmission mode indicator in the random access response is set or not, and acts accordingly. If the transmission mode indicator is set, the mobile terminal transmits 1005 the first scheduled transmission as scheduled by the grant within the random access response using TTI bundling. Accordingly, the mobile terminal builds a transport block and is coding same to obtain one or more redundancy versions of the transport block. Subsequently, the mobile terminal transmits a redundancy version of the transport block in a respective transmission time interval of the TTI bundle.

Optionally, HARQ may be used for the transmission of the first scheduled transmission. Hence, all transmissions in the TTI bundle are sent on the same HARQ process. Furthermore, the mobile terminal is receiving HARQ feedback after having transmitted the first bundled transmission that is indicating whether the eNodeB could successfully decode the transport block conveyed within the transmission bundle (ACK) or not (NACK).

If the transmission mode indicator is not set, the mobile terminal transmits 1006 transmits the first transmission as scheduled by the grant within the random access without TTI bundling. Accordingly, the mobile terminal builds a transport block and is coding same to obtain one or more redundancy versions of the transport block. Subsequently, the mobile terminal transmits one (advantageously self-decodable) redundancy version of the transport block within the transmission time interval as allocated by the grant within the random access response message.

Next, the operation of the base station is discussed with respect to FIG. 11 showing a flow chart of the exemplary operation of a base station in a contention based random access procedure according to an embodiment of the invention. In the contention based random access procedure, the base station first receives 1101 a random access preamble from a mobile terminal. In response to this preamble, the eNode B determines whether TTI bundling can be supported for the first scheduled transmission 1102. This decision may depend on one of more of several criteria, such as the mobile terminal's capability to support TTI bundling in the random access procedure, the processing load of the base station, the availability of resources, a mobile terminal's request for TTI bundling etc.

If TTI bundling can be supported, the base station's scheduler schedules the first scheduled transmission of mobile terminal and determines 1103 the corresponding grant, which is indicating the physical channel resources (e.g. number of resource elements) of the transmission and further L1/L2 control signaling parameters (e.g. modulation and coding scheme, new data indicator, etc.).

Subsequently, the base station forms the random access response and transmits 1104 same to the mobile terminal. In one exemplary implementation, where the random access response format shown in FIG. 14 is used, the base station also sets the transmission mode indicator (TM) within the grant (see UL Grant field) to indicate use of the TTI bundling mode. Alternatively, in another exemplary implementation, the message format as shown in FIG. 13 is used and the transmission mode indicator (TM) in the first bit of the message is set to indicate use of the TTI bundling mode for the scheduled transmission. Subsequently, the base station receives 1105 the first scheduled transmission from the mobile terminal on the resources allocated by the grant and using TTI bundling. The base station receives all transmissions of the bundle (i.e. the redundancy versions of the transport blocks) and soft-combines them prior to the decoding attempt by the base station's decoder.

The steps of the base station in case no TTI bundling is to be used are similar except for the transmission mode indicator being not set. Also in this case the base station's scheduler schedules the transmission of the mobile terminal and generates 1106 a corresponding grant for transmission 1107 to the mobile terminal in the random access response message. Subsequently, the base station receives 1108 the first scheduled transmission from the mobile terminal on the resources allocated by the grant, wherein no TTI bundling is used. The base station receives the transmission and tries to decode same in the base station's decoder.

It should be further noted that in the examples discussed with respect to FIG. 10 and FIG. 11 above, the allocated resources for the mobile terminal according to the grant comprised in the random access response message yield a transport block size for the first scheduled transmission sufficient in size to transmit a RRC connection setup request and a NAS service request simultaneously. As explained above, in case of using TTI bundling, the base station's scheduler can for example use a more aggressive modulation and coding scheme (i.e. a higher order modulation scheme and/or higher code rate) due to the soft-combining gain obtained by TTI bundling in comparison to a non-bundling transmission that is allocated the same number of resource elements on the physical channel.

In another exemplary embodiment the transmission mode indicator which is signaled within the Random access response message indicates whether the user equipment should use one of the defined transmission modes for the transmission of the first scheduled uplink transmission of the random access procedure. As outlined before the transmission mode indicator could for example instruct the user equipment to use TTI bundling for the first scheduled uplink transmission. Alternatively there could be other transmission modes defined. In one exemplary transmission mode the user equipment has the freedom to select itself the transport format for the first uplink message. The user equipment could choose the transport format such that the transport block size for the first scheduled transmission is sufficient in size to transmit a RRC connection setup request and a NAS service request simultaneously. Thus in this exemplary embodiment the base station indicates to the user equipment within the random access response message, for example as mentioned in one of the previous embodiments by means of the CQI request bit or the reserved bit, whether the user equipment shall perform the uplink transmission in accordance to the UL grant signaled in the random access response message or whether the user equipment has the freedom to select the transport format itself.

Figure 15:
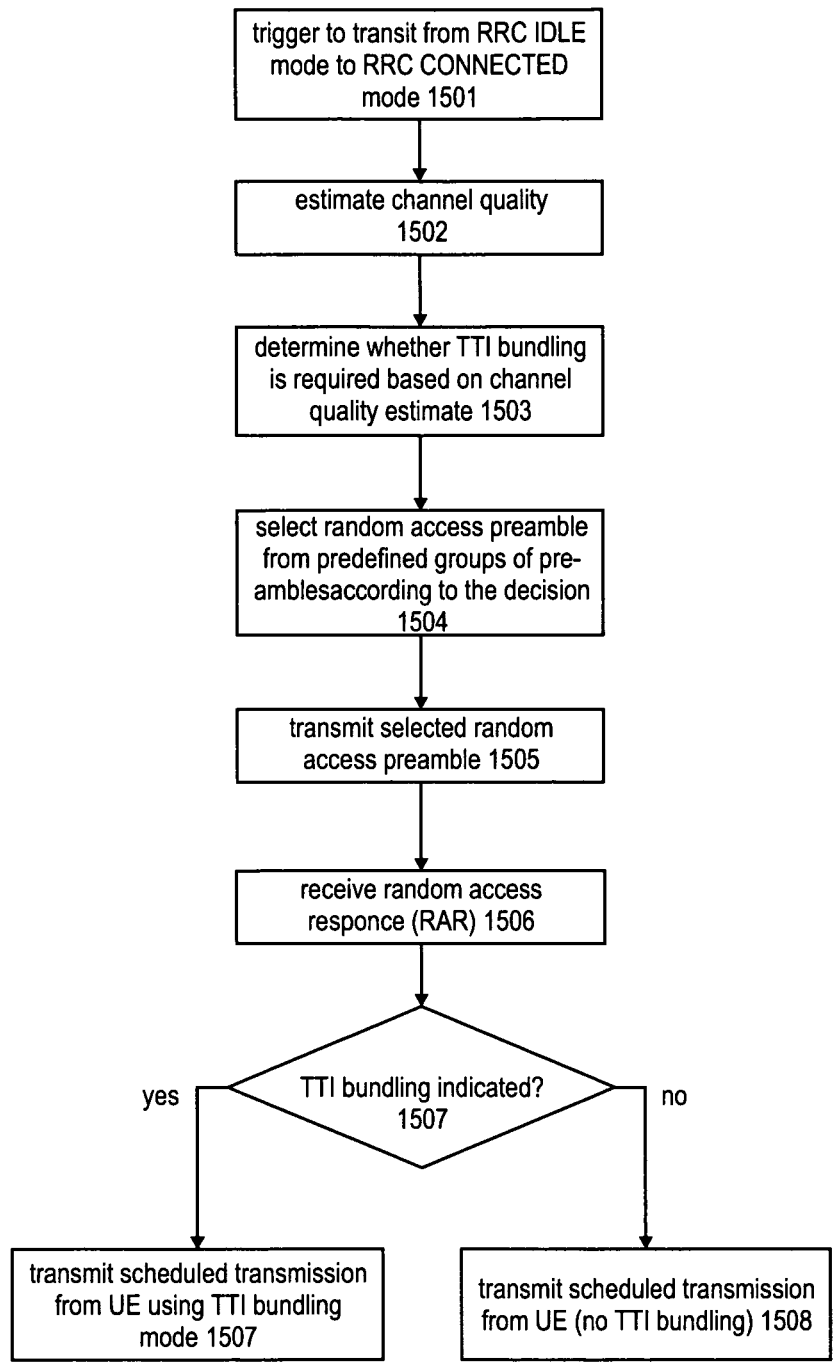

Next another exemplary embodiment of the invention relating to a more detailed implementation of a contention based random access procedure according to another embodiment of the invention that is supporting TTI bundling will be discussed with respect to FIG. 15. Essentially, the procedure of FIG. 15 can be considered a more advanced and detailed operation of the mobile terminal as shown in FIG. 10.

In a first step, there is a trigger 1501 to transit from RRC IDLE mode to RRC CONNECTED mode within the mobile terminal. Such trigger could be for example a paging request, such as for example a user starting a telephone call or an application. Accordingly, this trigger will cause the mobile terminal to perform a contention based random access procedure (assuming that the mobile terminal is in RRC IDLE mode).

The mobile terminal determines 1503 whether TTI bundling for the scheduled transmission is required in order to transmit a combined NAS/RRC message (i.e. the RRC connection setup request and the NAS service request) within one transport block. For example a mobile terminal located at the cell center, i.e. experiencing good channels conditions, might be able to transmit the combined NAS/RRC message without using TTI bundling. Basically the TTI bundling transmission mode is targeting mobile terminals at the cell edges, which are power limited. Essentially, the mobile terminal could for example estimate 1502 the uplink channel quality, e.g. based on downlink path loss (RSRP), and determines the required transmission mode (TTI-bundling/non-bundling) for the scheduled transmission based on this measurement.

The decision of the transmission mode is for example done based on a threshold which could be for example signaled by eNodeB, e.g. broadcasted in the system information. Alternatively it could be completely left up to mobile terminal's implementation to decide the transmission mode for the first scheduled transmission of the random access procedure. This threshold could be a pathloss based threshold. Alternatively the decision of the transmission mode could be also based on the available transmit power, which is also referred to as power headroom sometimes.

At the next step the mobile terminal needs to indicate to eNodeB the "desired" transmission mode for the first scheduled transmission as an outcome of the above mentioned decision, which is also indicating the mobile terminal's capability of supporting TTI bundling for the first scheduled transmission during random access.

For example, in a 3GPP based system that should support 3GPP LTE (Rel. 8) compatible mobile terminals and 3GPP LTE (Rel. 10) compatible mobile terminals, it can be assumed that the 3GPP LTE (Rel. 8) compatible mobile terminal cannot use TTI bundling for the first scheduled uplink transmission within the contention based random access procedure. Therefore this capability indication is inherently a release indication, i.e. Rel. 8 or Rel. 10. In one embodiment of the invention a combined indication of the required transmission mode and mobile terminal's capability is used.

This combined indication can be done by means of RACH preamble selection. For example one set of RACH preambles, e.g. preamble group A, indicates that the mobile is a 3GPP LTE-A (Rel. 10) compatible UE and requests the use of TTI bundling for the scheduled transmission. A second group of RACH preambles, e.g. group B, could be defined, of which one preamble is chosen by 3GPP LTE (Rel. 8)-compatible UEs or 3GPP LTE-A (Rel. 10)-compatible UEs not requiring TTI bundling during random access. Alternatively, the available random access preambles (RACH preambles) could also be grouped in 3 different groups A, B and C. In this case a preamble of group A indicates a 3GPP LTE-A (Rel. 10)-compatible UE and requests use of TTI bundling for the scheduled transmission; a preamble of group B indicates a 3GPP LTE-A (Rel. 10) compatible UE and indicates that no TTI bundling for the scheduled transmission is needed; and a preamble of group C indicates a 3GPP LTE (Rel. 8)-compatible UE which is not supporting TTI bundling. Of course, the exact configuration and grouping is implementation dependent and the above examples are intended to give an idea on how the grouping of preambles could be implemented.

The mobile terminal selects 1504 a preamble from one of the defined groups depending on whether TTI bundling is required or not, respectively supported by the mobile terminal during random access. The mobile terminal transmits 1505 the selected random access preamble to the eNodeB. Based on the detected preamble, the eNodeB knows whether a mobile terminal is capable of using TTI bundling and whether TTI bundling is required in order to transmit the combined NAS/RRC message. The eNodeB considers this information for subsequent scheduling of the first scheduled transmission by the mobile terminal. If TTI bundling mode is requested for the scheduled transmission (and can be supported by the eNodeB), the transmission mode indicator in the random access response message is set by the eNodeB.

The mobile terminal receives 1506 the random access response from the eNodeB. A 3GPP LTE (Rel. 8)-compatible mobile terminal will ignore the transmission mode indicator, while a 3GPP LTE-A (Rel. 10)-compatible mobile terminal will check the transmission mode indicator within the random access response to determine 1507 whether TTI bundling is to be used for the scheduled transmission.

If TTI bundling is to be used, the mobile terminal transmits 1507 the scheduled transmission using TTI bundling. If no TTI bundling is to be used, the mobile terminal transmits 1508 the scheduled transmission without using TTI bundling. In both cases the scheduled transmission comprises for example a combined NAS/RRC message.

Mobile terminal's that do not support TTI bundling during random access may simply ignore the transmission mode indicator in the random access response message and may operate in a conventional manner. For example, a 3GPP LTE (Rel. 8) random access procedure can be used.

In a further embodiment of the invention, the preambles defined in a radio cell and their grouping is signed by means of system broadcast by the base station. In a 3GPP system implementation the system broadcast information of the eNodeB may comprise System Information Block(s) that indicate the preambles for contention based initial access in the radio cell controlled by the eNodeB and further the grouping of these preambles. Furthermore, it should be also noted that optionally the configuration of the physical random access channel (PRACH) resources on which the preambles are to be signaled by the user equipments may also be broadcasted within the system broadcast information. For example, the system broadcast information could indicate a set of preambles per defined group as well as the PRACH resources. The system broadcast information of a radio cell are received by the mobile terminals so that the mobile terminals can be informed on the preambles and preamble groups defined in the radio cell and the PRACH resources for transmitting a selected preamble to initiate the contention based random access procedure.

In a further exemplary implementation, in order to achieve backward compatibility, the (group of) preambles for requesting TTI bundling mode for the first scheduled transmission of the random access procedure could be for example defined by a so-called non-critical extension to the system information encoding of 3GPP LTE (Rel. 8) within the 3GPP LTE-A (Rel. 10) system specification, i.e. those extensions are only "visible" to 3GPP LTE-A (Rel. 10)-compliant user equipments and will be ignored by 3GPP LTE (Rel. 8)-compliant user equipments.

In the exemplary embodiments of the invention discussed so far, the uplink transmission mode (e.g. TTI bundling/non-bundling) is configured by MAC control signaling via the physical downlink shared channel (PDSCH). This means that the transmission mode may be for example signaled by means of the a random access response on the PDSCH within a 3GPP system. In one embodiment of the invention, the transmission mode configured by random access response is only valid for the first scheduled transmission transmission. If TTI bundling should be used for further uplink transmission (e.g.

on the uplink shared channel (UL-SCH) in a 3GPP system) in RRC CONNECTED mode, the transmission mode may be configured RRC signaling.

In an alternative embodiment of the invention, the mobile terminal uses the transmission mode signaled in the random access response message for all subsequent uplink transmission until a new configuration is signaled by RRC signaling. According to LTE Release-8, TTI bundling is enabled/disabled by RRC signaling. However, according to the invention, TTI bundling is enabled by MAC signaling. Correspondingly, a rule may be defined regulating that if TTI bundling was configured by the RAR message (MAC signaling), the UE uses this configuration for subsequent UL-SCH transmissions too, i.e. after successful RACH procedure instead of using the non-bundling "default" configuration selected if the RRC signaling does not explicitly specify a Transmission Mode.

In more detail, considering the procedure of FIG. 9, the mobile terminal may use TTI bundling for the transmission in steps 903 and 905, since the Random Access Response message 902 indicated the Transmission Mode to be TTI bundling. The mobile terminal shall thus use TTI bundling for all uplink transmissions according to Random Access Response message of the MAC signaling. However, in the LTE-Release 8 the RRC Connection Reconfiguration in step 908 could be used for example to configure the transmission mode—for example there may be a corresponding information element (IE) in this message to do so. In order to maintain the Transmission Mode indicated by the Random Access Response message, it is possible to adapt the RRC protocol behavior. One possibility is to redefine the "default mode", which is selected if no particular transmission mode is selected with the RRC connection Reconfiguration message, as follows: If no Transmission Mode has been indicated previously, e.g. by the Random Access Response message, a non-bundling mode should be used for uplink transmission. However, if a Transmission Mode was indicated before, said Transmission Mode should be maintained. Alternatively, when the Random Access Response message indicates a particular Transmission Mode, the "default mode", that is to be selected during the RRC Reconfiguration, shall be substituted by said indicated Transmission Mode. Therefore, when later the RRC Connection Reconfiguration message does not indicate anything and thus the "default mode" is selected, the previously indicated Transmission Mode is maintained.

Instead of using a flag or bit within the random access response as transmission mode indicator, in another alternative embodiment of the invention, the indication of the transmission mode is done based on the RNTI used on PDCCH for addressing the random access response message. According to this embodiment, a new second RA-RNTI is defined that, when used for addressing the random access response by the eNodeB, indicates the use of the TTI bundling mode. This would allow the eNodeB to schedule mobile terminals that support TTI bundling during random access differently than mobile terminals that do not support TTI bundling during random access, as it can be assumed that only mobile terminals that support TTI bundling during random access are listening/monitoring to this new RNTI. The second RA-RNTI could further implicitly instruct mobile terminal to use TTI bundling for the scheduled transmission of the random access procedure.

For example, considering the parallel support of 3GPP LTE (Rel. 8)-compatible mobile terminals and 3GPP LTE-A (Rel. 10)-compatible mobile terminals, in case a 3GPP LTE-A (Rel. 10)-compatible mobile terminal receives the random access response the CRC field of which is masked with a RA-RNTI as defined for 3GPP LTE (Rel. 8), the mobile terminal could interpret this as a request to use the "non-bundling" mode for the scheduled transmission, whereas upon reception of a PDCCH addressed using the second RA-RNTI, a 3GPP LTE-A (Rel. 10)-compatible mobile terminal uses TTI-bundling for the scheduled transmission of the random access procedure.

In one further more advanced implementation, the RA-RNTI is determined based on the PRACH resource used for the transmission of the random access preamble—typically, the PRACH resource is converted into a RA-RNTI according some predefined equation. Accordingly, in one further exemplary implementation, the user equipment and the eNodeB may be assumed to use two equations for determining the RA-RNTI from the PRACH resource used for the transmission of the random access preamble. These equations are available to both, the user equipment and the eNodeB. The equations produce different RA-RNTIs, wherein one equation produces the first RA-RNTI indicates the non-bundling transmission mode, while the second equation produces the before mentioned "second" RA-RNTI that indicates the use of the TTI bundling mode.

In a typical implementation, a TTI bundle is set to 4 subframes. As indicated above, in one exemplary implementation, the same TTI bundle size is also used for the first scheduled transmission transmissions, if TTI bundling is activated. In an alternative embodiment of the invention, the eNodeB explicitly indicates the bundle size for the TTI bundling transmission mode. For example an additional field (e.g. 2 bits in size) could be introduced to the random access response in order to indicate a bundle size of 1 to 4 subframes. This would give eNodeB additional flexibility in scheduling the first scheduled transmission. For example, depending on the cell deployment a bundle size of 2 subframes might be sufficient for the first scheduled transmission of the random access procedure. In a further alternative variant, a message field conveying the Transmission Power Control (TPC) bits—being part of the UL Grant as shown in FIG. 7—in the random response message could be reused for indicating the TTI bundle size. In said case the meaning/interpretation of the field conventionally conveying the TPC bits in the format of FIG. 7 could depend on whether TTI-bundling is used or not (e.g. as indicated in the Reserved Bit field shown in FIG. 13 or in the CQI Bit field shown in FIG. 14). For instance, when the CQI or Reserved bit indicates TTI-bundling, the TPC bits would indicate the TTI bundle size. Also other fields of the message format of FIG. 7 could be used for the indication of the bundle size.

In the Technical Background section, it has been indicated that there are essentially five different scenarios in a 3GPP system which are relevant for random access. For the contention based random access, the eNodeB cannot distinguish between the different scenarios, i.e. eNodeB doesn't know why the user equipment is making contention based RACH access. Therefore, in another embodiment of the invention, the eNodeB may instruct a user equipment to use TTI bundling for the first scheduled message also for other cases then initial access. If it is desired to ensure that the use of TTI bundling is limited to the initial access scenario (i.e. where the user equipments are in RRC IDLE mode), the user equipments could for example indicate the "purpose" of the RACH access to the eNodeB. This could be for example realized by reserving specific RACH preambles for use in an initial access scenario. Following the already described concept of RACH preamble groups, according to another embodiment of the invention, a certain set of preambles could indicate that a user equipment is capable of using TTI bundling (release indication) and that the required transmission mode is "TTI-bundling" as well as that the PRACH purpose is initial access.

It should be further noted that the proposed improvements to the random access procedure may be readily applied to the random access procedure of 3GPP LTE (Rel. 8) as known from 3GPP TS 36.321, mentioned previously herein and having been incorporated herein. Such extension of the 3GPP LTE (Rel. 8) random access in accordance with the various aspects and embodiments of the invention described above may be readily applied to a 3GPP LTE-A (Rel. 10) random access procedure.

Even if throughout the document only Random access procedures in a cell under the control of an base station was mentioned, the embodiments of the invention apply in the same way to relay nodes.

Another embodiment of the invention relates to the implementation of the above described various embodiments using hardware and software. It is recognized that the various embodiments of the invention may be implemented or performed using computing devices (processors). A computing device or processor may for example be general purpose processors, digital signal processors (DSP), application specific integrated circuits (ASIC), field programmable gate arrays (FPGA) or other programmable logic devices, etc. The various embodiments of the invention may also be performed or embodied by a combination of these devices.

Further, the various embodiments of the invention may also be implemented by means of software modules, which are executed by a processor or directly in hardware. Also a combination of software modules and a hardware implementation may be possible. The software modules may be stored on any kind of computer readable storage media, for example RAM, EPROM, EEPROM, flash memory, registers, hard disks, CD-ROM, DVD, etc.

It should be further noted that the individual features of the different embodiments of the invention may individually or in arbitrary combination be subject matter to another invention.

It would be appreciated by a person skilled in the art that numerous variations and/or modifications may be made to the present invention as shown in the specific embodiments without departing from the spirit or scope of the invention as broadly described. The present embodiments are, therefore, to be considered in all respects to be illustrative and not restrictive.

The invention claimed is:

1. A random access procedure for use in a mobile communication system comprising: transmitting, by a base station, a random access response in response to receiving a random access preamble from a mobile terminal, wherein the random access response message comprises a grant in a resource grant field for a scheduled transmission by the mobile terminal and a transmission mode indicator indicating the uplink transmission mode for the scheduled transmission,
   wherein the transmission mode indicator is included in a separate field of the random access response message, and
   wherein the resource grant field comprises a flag which is used for signalling (i) said transmission mode indicator, if the random access procedure is a contention based random access procedure, and (ii) a CQI request bit for requesting a CQI report from the mobile terminal, if the random access procedure is a non-contention based random access procedure.

2. The random access procedure according to claim 1, further comprising the step of transmitting by the mobile terminal said random access preamble to the base station, wherein the random access preamble indicates to the base station the transmission mode requested by the mobile terminal for the scheduled uplink transmission.

3. The random access procedure according to claim 2, wherein further comprising the step of selecting the random access preamble out of a plurality of predefined preambles, wherein the predefined preambles are assigned to different groups associated to respective requested transmission modes for the scheduled uplink transmission.

4. The random access procedure according to claim 3, wherein the predefined preambles are assigned to different groups associated to respective requested transmission modes for the scheduled uplink transmission further indicate the mobile terminal's compatibility with a specific release of the mobile communication system.

5. The random access procedure according to claim 2, wherein the scheduled uplink transmission comprises a RRC connection request and a request for a non-access stratum service and the random access procedure further comprises a request for a non-access stratum service.

6. The random access procedure according to claim 5, further comprising the following step of performing by the base station, in response to the RRC connection request, respectively, the request for a non-access stratum service, a RRC connection setup in parallel to establishment of a S1 connection between base station and core network.

7. The random access procedure according to claim 6, wherein the connection setup procedure is setting up a RRC connection between the base station and the mobile terminal and the non-access stratum procedure is setting up at least one dedicated radio bearer between the base station and the core network node in the mobile communication system's core network.

8. The random access procedure according to claim 1, further comprising the step of transmitting said scheduled uplink transmission from the mobile station to the base station according to the transmission mode indicated in the random access response message, and
   wherein the transmission mode indicated in the random access response message is a TTI bundling mode, and the mobile terminal is transmitting redundancy versions of the same transport block within a number of consecutive transmission time intervals on the resources granted in the random access response message.

9. A base station for performing a random access procedure in a mobile communication system, comprising:
   a receiver for receiving a random access preamble from a mobile terminal,
   a transmitter for transmitting a random access response to the mobile terminal in response to receiving the random access preamble, wherein the random access response message comprises a grant in a resource grant field for a scheduled transmission by the mobile terminal and a transmission mode indicator indicating the uplink transmission mode for the scheduled transmission,
   wherein the transmission mode indicator is included in a separate field of the random access response message, and
   wherein the resource grant field comprises a flag which is used for signalling (i) said transmission mode indicator, if the random access procedure is a contention based random access procedure, and (ii) a CQI request bit for requesting a CQI report from the mobile terminal, if the random access procedure is a non-contention based random access procedure.

10. The base station according to claim 9, wherein the receiver is adapted to receive in response to the random access response a scheduled uplink transmission from the mobile terminal according to the transmission mode indicated in the random access response.

11. The base station according to claim 10, wherein the scheduled uplink transmission comprises a RRC connection request and a non-access stratum service request, and wherein the base station is further adapted to perform a RRC connection setup procedure in parallel to the establishment of a S1 connection between base station and core network.

12. The base station according to claim 9, wherein the random access preamble indicates to the base station the transmission mode requested by the mobile terminal for the scheduled uplink transmission.

13. A mobile terminal for performing a random access procedure in a mobile communication system, comprising:
   a transmitter for transmitting a random access preamble to a base station,
   a receiver for receiving the random access response from the base station in response to receiving a random access preamble, wherein the random access response message comprises a grant in a resource grant field for a scheduled transmission by the mobile terminal and a transmission mode indicator indicating the uplink transmission mode for the scheduled transmission,
   wherein the transmission mode indicator is included in a separate field of the random access response message, and
   wherein the resource grant field comprises a flag which is used for signalling (i) said transmission mode indicator, if the random, access procedure is a contention based random access procedure, and (ii) a CQI request bit for requesting a CQI report from the mobile terminal, if the random access procedure is a non-contention based random access procedure.

14. The mobile terminal according to claim 13, wherein the transmitter is adapted to transmit in response to the random access response a scheduled uplink transmission from the mobile terminal according to the transmission mode indicated in the random access response.

15. The mobile terminal according to claim 14, wherein the scheduled uplink transmission comprises a RRC connection request and a non-access stratum service request.

* * * * *